US012712620B2

(12) United States Patent
Zhou et al.

(10) Patent No.: US 12,712,620 B2
(45) Date of Patent: Aug. 18, 2026

(54) TRANSPORT BLOCK SPECIFIC BEAM CONFIGURATION FOR MULTIPLE TRANSPORT BLOCK TRANSMISSION

(71) Applicant: QUALCOMM Incorporated, San Diego, CA (US)

(72) Inventors: Yan Zhou, San Diego, CA (US); Fang Yuan, Beijing (CN); Mostafa Khoshnevisan, San Diego, CA (US); Mahmoud Taherzadeh Boroujeni, San Diego, CA (US); Olufunmilola Omolade Awoniyi-Oteri, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 235 days.

(21) Appl. No.: 18/260,883

(22) PCT Filed: Mar. 31, 2022

(86) PCT No.: PCT/CN2022/084401

§ 371 (c)(1),
(2) Date: Jul. 10, 2023

(87) PCT Pub. No.: WO2022/206890

PCT Pub. Date: Oct. 6, 2022

(65) Prior Publication Data

US 2024/0063879 A1 Feb. 22, 2024

(30) Foreign Application Priority Data

Mar. 31, 2021 (WO) ................ PCT/CN2021/084364

(51) Int. Cl.
*H04B 7/06* (2006.01)
*H04L 5/00* (2006.01)

(52) U.S. Cl.
CPC ......... *H04B 7/06952* (2023.05); *H04B 7/063* (2013.01); *H04L 5/0094* (2013.01)

(58) Field of Classification Search
CPC ... H04B 7/06952; H04B 7/063; H04L 5/0094; H04L 5/0023
See application file for complete search history.

(56) References Cited

U.S. PATENT DOCUMENTS

2019/0327743 A1 10/2019 Shi et al.
2020/0314860 A1 10/2020 Zhou et al.
(Continued)

FOREIGN PATENT DOCUMENTS

CN 109792745 A 5/2019
WO WO-2019244348 A1 12/2019
(Continued)

OTHER PUBLICATIONS

Ericsson: "UE Demodulation Requirements for eMIMO", 3GPP TSG-RAN WG4 Meeting #94-e, R4-2001363, Electronic Meeting, Feb. 24-Mar. 6, 2020, pp. 1-5.
(Continued)

*Primary Examiner* — Steven Hieu D Nguyen
(74) *Attorney, Agent, or Firm* — Harrity & Harrity LLP/Qualcomm Incorporated

(57) ABSTRACT

Techniques and apparatuses for transport block specific beam configuration for multiple transport block transmission are disclosed. In some aspects, a user equipment (UE) may receive a transport block (TB) specific beam configuration for communicating a plurality of TBs, wherein the TB specific beam configuration indicates one or more beams corresponding to the plurality of TBs, and wherein the TB
(Continued)

1200 specific configuration comprises at least one beam configuration corresponding to at least one of a TB of the plurality of TBs or a TB group of a plurality of TB groups. The UE may communicate the plurality of TBs based at least in part on the beam configuration. Numerous other aspects are disclosed.

30 Claims, 16 Drawing Sheets

(56) References Cited

U.S. PATENT DOCUMENTS

| | | | | |
|---|---|---|---|---|
| 2021/0099260 | A1* | 4/2021 | Guan | H04L 1/189 |
| 2021/0144722 | A1* | 5/2021 | Yang | H04W 72/046 |
| 2021/0194636 | A1* | 6/2021 | Huang | H04L 1/1854 |
| 2022/0078766 | A1* | 3/2022 | Li | H04B 7/0408 |
| 2022/0225361 | A1* | 7/2022 | Lee | H04W 72/1268 |
| 2022/0286868 | A1* | 9/2022 | Kim | H04L 1/0075 |
| 2022/0304035 | A1* | 9/2022 | Zhang | H04W 72/23 |
| 2023/0412238 | A1* | 12/2023 | Tran | H04W 16/28 |

FOREIGN PATENT DOCUMENTS

| | | | |
|---|---|---|---|
| WO | 2020064119 | A1 | 4/2020 |
| WO | 2020132885 | A1 | 7/2020 |
| WO | WO-2020225690 | A1 | 11/2020 |
| WO | WO-2020258041 | A1 | 12/2020 |

OTHER PUBLICATIONS

International Search Report and Written Opinion—PCT/CN2022/084401—ISA/EPO—Jun. 8, 2022.

International Search Report and Written Opinion—PCT/CN2021/084364—ISA/EPO—Dec. 31, 2021.

Qualcomm Incorporated: “Multi-TRP Enhancements”, 3GPP TSG-RAN WG1 Meeting #96b, 3GPP Draft; R1-1905026, Multi-TRP Enhancements, 3rd Generation Partnership Project (3GPP), Mobile Competence Centre, 650, Route Des Lucioles, F-06921 Sophia-Antipolis Cedex, France, vol. RAN WG1, No. Xi’an, China, Apr. 8-Apr. 12, 2019, Apr. 7, 2019 (Apr. 7, 2019), XP051700135, Apr. 8-Apr. 12, 2019, 29 Pages, p. 5-p. 6.

Supplementary European Search Report—EP22779070—Search Authority—Munich—Jan. 27, 2025.

* cited by examiner

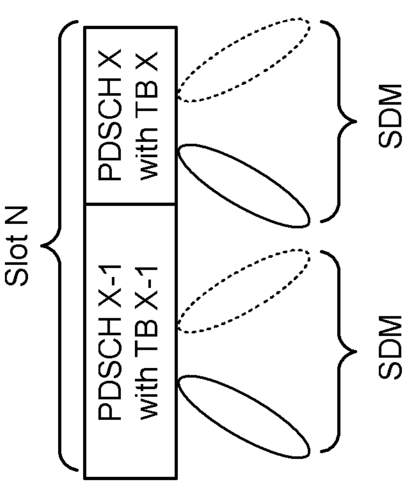
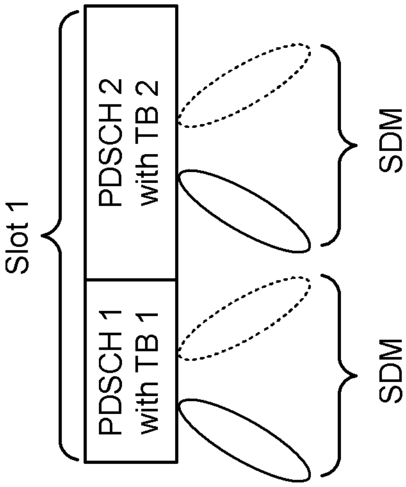
FIG. 5
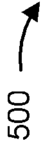

600

DCI

900

1100

1300

TRANSPORT BLOCK SPECIFIC BEAM CONFIGURATION FOR MULTIPLE TRANSPORT BLOCK TRANSMISSION

CROSS-REFERENCE TO RELATED APPLICATION APPLICATIONS

This Patent Application is a 371 national stage of PCT Application No. PCT/CN2022/084401 filed on Mar. 31, 2022, entitled "TRANSPORT BLOCK SPECIFIC BEAM CONFIGURATION FOR MULTIPLE TRANSPORT BLOCK TRANSMISSION," which claims priority to PCT Application No. PCT/CN2021/084364, filed on Mar. 31, 2021, entitled "TRANSPORT BLOCK SPECIFIC BEAM CONFIGURATION FOR MULTIPLE TRANSPORT BLOCK TRANSMISSION," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for transport block specific beam configuration for multiple transport block transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a transport block (TB) specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups; and communicating the plurality of TBs based at least in part on the beam configuration.

In some aspects, a method of wireless communication performed by a network node includes transmitting a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups; and communicating the plurality of TBs based at least in part on the beam configuration.

In some aspects, a UE for wireless communication includes a memory; and one or more processors, coupled to the memory, configured to: receive a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups; and communicate the plurality of TBs based at least in part on the beam configuration.

In some aspects, a network node for wireless communication includes a memory; and one or more processors, coupled to the memory, configured to: transmit a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups; and communicate the plurality of TBs based at least in part on the beam configuration.

In some aspects, a non-transitory computer-readable medium storing a set of instructions for wireless communication includes one or more instructions that, when executed by one or more processors of a UE, cause the UE to: receive a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups; and communicate the plurality of TBs based at least in part on the beam configuration.

In some aspects, a non-transitory computer-readable medium storing a set of instructions for wireless communication includes one or more instructions that, when executed by one or more processors of a network node, cause the network node to: transmit a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups; and communicate the plurality of TBs based at least in part on the beam configuration.

In some aspects, an apparatus for wireless communication includes means for receiving a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups; and means for communicating the plurality of TBs based at least in part on the beam configuration.

In some aspects, an apparatus for wireless communication includes means for transmitting a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups; and means for communicating the plurality of TBs based at least in part on the beam configuration.

Aspects generally include a method, apparatus, system, computer program product, non-transitory computer-readable medium, user equipment, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 4-11 are diagrams illustrating examples associated with transport block (TB) specific beam configuration for multiple TB transmission, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
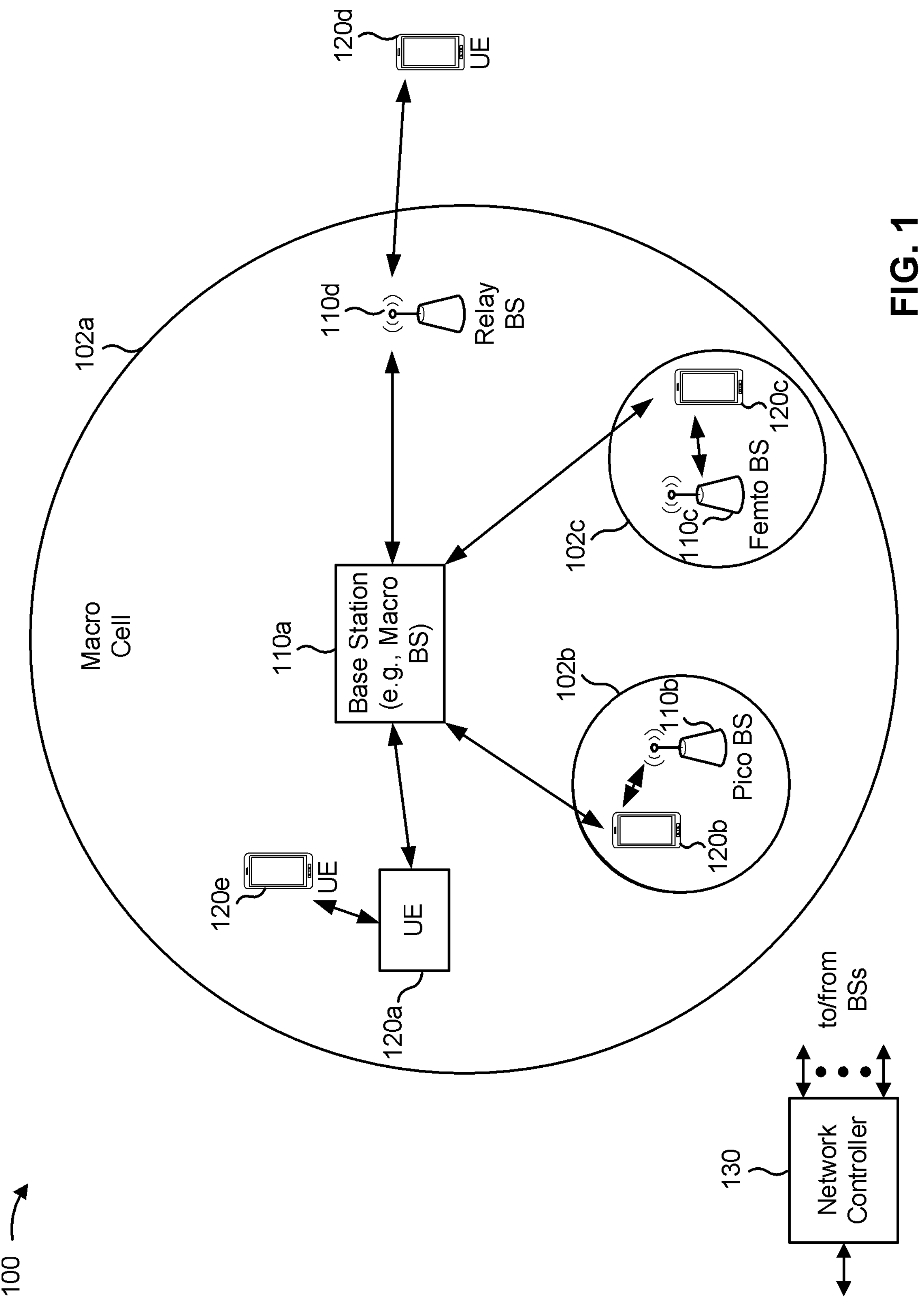
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As described herein, a network node, which may be referred to as a "node" or a "wireless node," may be a base station (e.g., base station 110), a UE (e.g., UE 120), a relay device, a network controller, an apparatus, a device, a computing system, one or more components of any of these, and/or another processing entity configured to perform one or more aspects of the techniques described herein. For example, a network node may be a UE. As another example, a network node may be a base station. A network node may be an aggregated base station and/or one or more components of a disaggregated base station. As an example, a first network node may be configured to communicate with a second network node or a third network node. The adjectives "first," "second," "third," and so on are used for contextual distinction between two or more of the modified noun in connection with a discussion and are not meant to be absolute modifiers that apply only to a certain respective node throughout the entire document. For example, a network node may be referred to as a "first network node" in connection with one discussion and may be referred to as a "second network node" in connection with another discussion, or vice versa. Reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses a first network node being configured to receive information from a second network node, "first network node" may refer to a first UE, a first base station, a first apparatus, a first device, a first computing system, a first one or more components, a first processing entity, or the like configured to receive the information from the second network; and "second network node" may refer to a second UE, a second base station, a second apparatus, a second device, a second computing system, a second one or more components, a second processing entity, or the like.

As indicated above, FIG. 1 is provided as an example. Other examples may differ from what is described with regard to FIG. 1.

Figure 2:
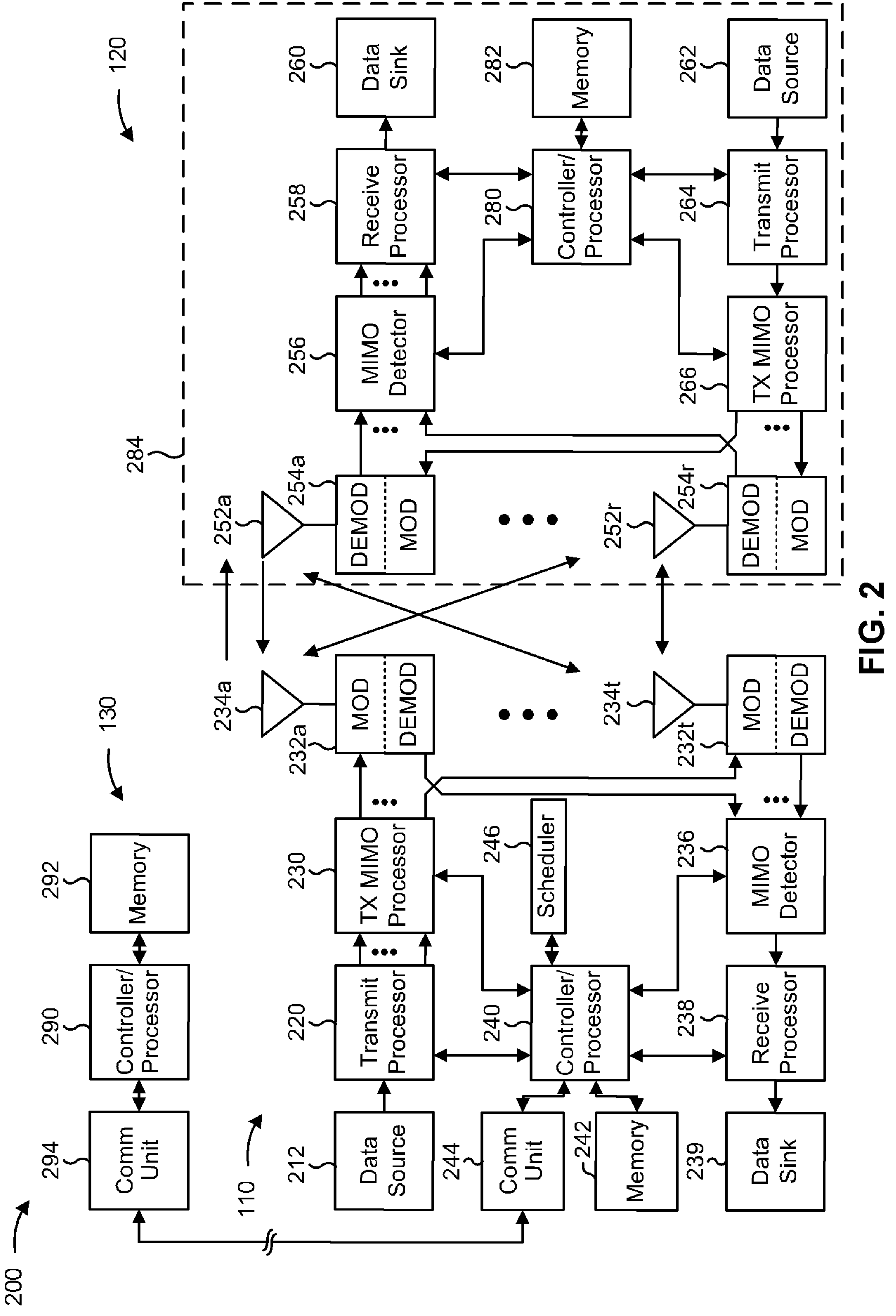
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

In some aspects, the terms "base station" (e.g., the base station 110), "network node," or "network entity" may refer to an aggregated base station, a disaggregated base station, an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (MC), or a Non-Real Time (Non-RT) MC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-16).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-16).

The controller/processor 240 of the base station 110, the controller/processor 280 of the UE 120, and/or any other component(s) of FIG. 2 may perform one or more techniques associated with transport block (TB) specific beam configuration for multiple TB transmission, as described in more detail elsewhere herein. In some aspects, the network node described herein is the base station 110, is included in the base station 110, or includes one or more components of the base station 110 shown in FIG. 2. For example, the controller/processor 240 of the base station 110, the controller/processor 280 of the UE 120, and/or any other component(s) of FIG. 2 may perform or direct operations of, for example, process 1200 of FIG. 12, process 1300 of FIG. 13, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some examples, executing instructions may include running the instructions, converting the instructions, compiling the instructions, and/or interpreting the instructions, among other examples.

In some aspects, the UE includes means for receiving a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups (e.g., using antenna 252, DEMOD 254, MIMO detector 256, receive processor 258, controller/processor 280, memory 282, or the like); or means for communicating the plurality of TBs based at least in part on the beam configuration (e.g., using antenna 252, DEMOD 254, MIMO detector 256, receive processor 258, controller/processor 280, memory 282, controller/processor 280, transmit processor 264, TX MIMO processor 266, MOD 254, antenna 252, memory 282, or the like). The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the network node includes means for transmitting a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups (e.g., using controller/processor 240, transmit processor 220, TX MIMO processor 230, MOD 232, antenna 234, memory 242, or the like); or means for communicating the plurality of TBs based at least in part on the beam configuration (e.g., using controller/processor 240, transmit processor 220, TX MIMO processor 230, MOD 232, antenna 234, memory 242, antenna 234, DEMOD 232, MIMO detector 236, receive processor 238, controller/processor 240, memory 242, or the like). The means for the network node to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
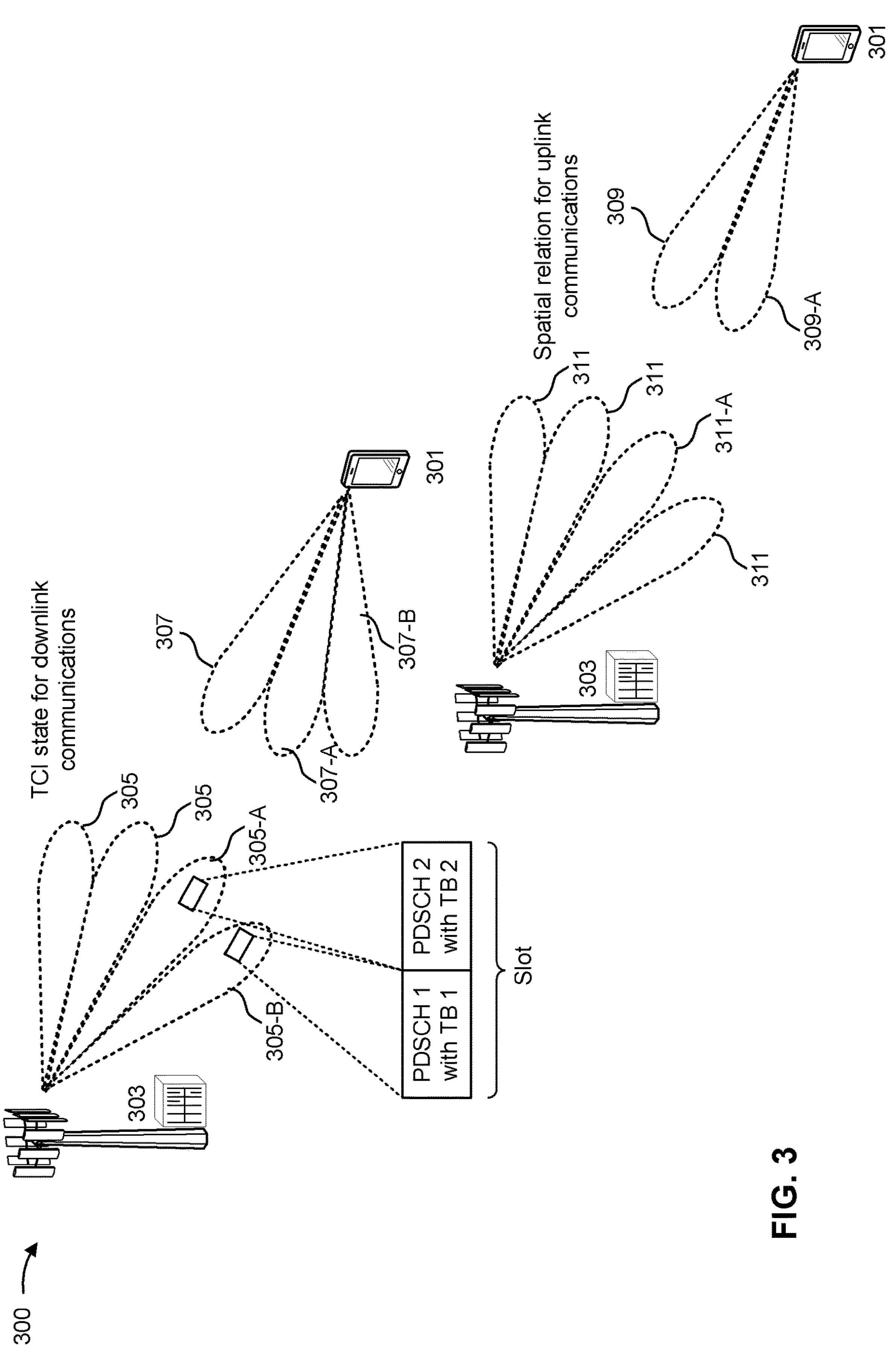
FIG. 3 is a diagram illustrating an example of using beams for communications between a network node and a UE, in accordance with the present disclosure.

FIG. 3 is a diagram illustrating an example 300 of using beams for communications between a network node and a UE, in accordance with the present disclosure. As shown in FIG. 3, a UE 301 and a network node 303 may communicate with one another.

The network node 303 may transmit to UEs 301 located within a coverage area of the network node 303. The network node 303 and the UE 301 may be configured for beamformed communications, where the network node 303 may transmit in the direction of the UE 301 using a directional BS transmit beam, and the UE 301 may receive the transmission using a directional UE receive beam. Each network node transmit beam may have an associated beam identifier (ID), beam direction, or beam symbols, among other examples. The network node 303 may transmit downlink communications via one or more network node transmit beams 305.

The UE 301 may attempt to receive downlink transmissions via one or more UE receive beams 307, which may be configured using different beamforming parameters at receive circuitry of the UE 301 (e.g., using antenna 252, DEMOD 254, MIMO detector 256, receive processor 258, controller/processor 280, memory 282, or the like). The UE 301 may identify a particular network node transmit beam 305, shown as network node transmit beam 305-A, and a particular UE receive beam 307, shown as UE receive beam 307-A, that provide relatively favorable performance (for example, that have a best channel quality of the different measured combinations of network node transmit beams 305 and UE receive beams 307). In some examples, the UE 301 may transmit an indication of which network node transmit beam 305 is identified by the UE 301 as a preferred network node transmit beam, which the network node 303 may select for transmissions to the UE 301. The UE 301 may thus attain and maintain a beam pair link (BPL) with the network node 303 for downlink communications (for example, a combination of the network node transmit beam 305-A and the UE receive beam 307-A), which may be further refined and maintained in accordance with one or more established beam refinement procedures.

A downlink beam, such as a network node transmit beam 305 or a UE receive beam 307, may be associated with a transmission configuration indicator (TCI) state. A TCI state may indicate a directionality or a characteristic of the downlink beam, such as one or more quasi co-location (QCL) properties of the downlink beam. A QCL property may include, for example, a Doppler shift, a Doppler spread, an average delay, a delay spread, or spatial receive parameters, among other examples. In some examples, each network node transmit beam 305 may be associated with a synchronization signal block (SSB), and the UE 301 may indicate a preferred network node transmit beam 305 by transmitting uplink transmissions in resources of the SSB that are associated with the preferred network node transmit beam 305. A particular SSB may have an associated TCI state (for example, for an antenna port or for beamforming). The network node 303 may, in some examples, indicate a downlink network node transmit beam 305 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 307 at the UE 301. Thus, the UE 301 may select a corresponding UE receive beam 307 from a set of BPLs based at least in part on the network node 303 indicating a network node transmit beam 305 via a TCI indication.

The network node 303 may maintain a set of activated TCI states for downlink shared channel transmissions and a set of activated TCI states for downlink control channel transmissions. The set of activated TCI states for downlink shared channel transmissions may correspond to beams that the network node 303 uses for downlink transmission on a physical downlink shared channel (PDSCH). The set of activated TCI states for downlink control channel communications may correspond to beams that the network node 303 may use for downlink transmission on a physical downlink control channel (PDCCH) or in a control resource set (CORESET). The UE 301 may also maintain a set of activated TCI states for receiving the downlink shared channel transmissions and the CORESET transmissions. If a TCI state is activated for the UE 301, then the UE 301 may have one or more antenna configurations based at least in part on the TCI state, and the UE 301 may not need to reconfigure antennas or antenna weighting configurations. In some examples, the set of activated TCI states (for example, activated PDSCH TCI states and activated CORESET TCI states) for the UE 301 may be configured by a configuration message, such as a radio resource control (RRC) message.

Similarly, for uplink communications, the UE 301 may transmit in the direction of the network node 303 using a directional UE transmit beam, and the network node 303 may receive the transmission using a directional network node receive beam. Each UE transmit beam may have an associated beam ID, beam direction, or beam symbols, among other examples. The UE 301 may transmit uplink communications via one or more UE transmit beams 309.

The network node 303 may receive uplink transmissions via one or more network node receive beams 311. The network node 303 may identify a particular UE transmit beam 309, shown as UE transmit beam 309-A, and a particular network node receive beam 311, shown as network node receive beam 311-A, that provide relatively favorable performance (for example, that have a best channel quality of the different measured combinations of UE transmit beams 309 and network node receive beams 311). In some examples, the network node 303 may transmit an indication of which UE transmit beam 309 is identified by the network node 303 as a preferred UE transmit beam, which the network node 303 may select for transmissions from the UE 301. The UE 301 and the network node 303 may thus attain and maintain a BPL for uplink communications (for example, a combination of the UE transmit beam 309-A and the network node receive beam 311-A), which may be further refined and maintained in accordance with one or more established beam refinement procedures. An uplink beam, such as a UE transmit beam 309 or a network node receive beam 311, may be associated with a spatial relation. A spatial relation may indicate a directionality or a characteristic of the uplink beam, similar to one or more QCL properties, as described above.

In some cases, a single downlink control information (DCI) transmission can schedule multiple PDSCH occasions or multiple physical uplink shared channel (PUSCH) occasions with different transport blocks (TBs). For example, each PDSCH occasion and/or PUSCH occasion can be used to transmit a TB and may have a particular duration, which may be confined within a slot. As shown in FIG. 3, for example, a first PDSCH occasion (shown as "PDSCH 1") may be used to transmit a first TB (shown as "TB 1") and a second PDSCH occasion (shown as "PDSCH 2") may be used to transmit a second TB (shown as "TB 2"). In some aspects, the slot may have a time duration of 14 symbols, and in other aspects, the slot may have a time duration of less than 14 symbols.

Each TB may include a corresponding hybrid automatic repeat request (HARM) process ID, a corresponding redundancy version ID (RVID), a corresponding new data indicator (NDI), a corresponding time domain resource allocation (TDRA), and/or a corresponding frequency domain resource allocation (FDRA), among other examples.

Multiple TBs may be transmitted using dynamic or semi-persistent resources, and each TB may have a corresponding quality of service (QoS) requirement. QoS requirements for services may vary, particularly in the case of higher frequency ranges (e.g., frequency ranges greater than FR2). Thus, in some cases, if multiple TBs (e.g., TB 1 and TB 2) are transmitted using a common beam and/or beam pair (e.g., 305-A and 310-A), reliability protection for one or more of the TBs may not be optimized. Similarly, a single DCI transmission can be used to schedule multiple TBs for different UEs, in which case reliability protection for one or more of the TBs may not be optimized if they are sent using a common beam. As a result, transmitting multiple TBs with a common beam may lead to unreliable communications, thereby having a negative impact on network performance.

Some aspects of techniques and apparatuses described herein provide for optimizing reliability protection based on QoS requirements per TB or TB group by providing a TB specific beam configuration for multiple TB transmission. For example, in some aspects, a network node may transmit, and a UE may receive, a TB specific beam configuration for communicating (e.g., transmitting and/or receiving) a plurality of TBs. The TB specific beam configuration may indicate one or more beams corresponding to the plurality of TBs. The TB specific configuration may include at least one beam configuration corresponding to at least one of a TB of the plurality of TBs or a TB group of a plurality of TB groups.

For example, as shown in FIG. 3, a TB specific beam configuration may indicate the beam 305-A and/or the beam 307-A to be used for communicating the TB 2. The TB specific beam configuration may indicate the beam 305-B and/or the beam 307-B for communicating the TB 1. The UE may communicate (e.g., transmit or receive) the plurality of TBs based at least in part on the beam configuration. In this way, some aspects described herein may facilitate per-TB (or per-TB group where a TB group may consist of multiple TBs) beam configuration, which may be used to optimize reliability protection per TB or TB group. As a result, some aspects may lead to more reliable communications, thereby having a positive impact on network performance.

As indicated above, FIG. 3 is provided as an example. Other examples may differ from what is described with respect to FIG. 3.

Figure 4:
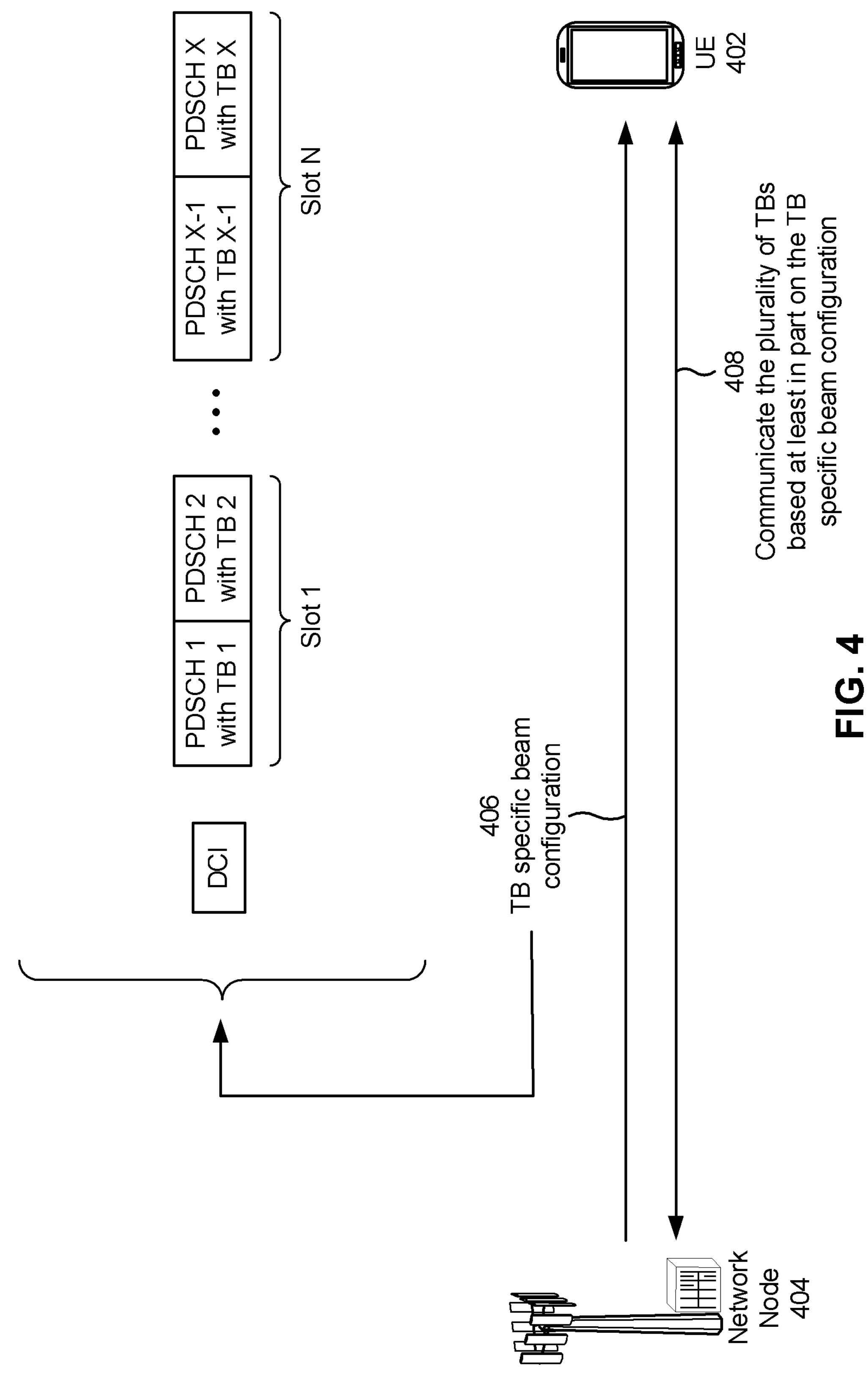

FIG. 4 is a diagram illustrating an example 400 of TB specific beam configuration for multiple TB transmission, in accordance with the present disclosure. As shown in FIG. 4, a UE 402 and a network node 404 may communicate with one another.

As shown by reference number 406, the network node 404 may transmit, and the UE 402 may receive, a TB specific beam configuration. The TB specific beam configuration may be for communicating a plurality of TBs. The TB specific beam configuration may indicate one or more beams corresponding to the plurality of TBs. The TB specific configuration may include at least one beam configuration corresponding to at least one TB of the plurality of TBs or a TB group of a plurality of TB groups. For example, in some aspects, the TB specific beam configuration may include a first beam configuration corresponding to a first TB of a plurality of TBs and a second beam configuration corresponding to a second TB of the plurality of TBs. In some aspects, the TB specific beam configuration may include a first beam configuration corresponding to a first TB group (e.g., a group of two or more TBs) and a second beam configuration corresponding to a second TB group.

In some aspects, the TB specific beam configuration may include a time division multiplexing (TDM) based beam configuration, a frequency division multiplexing (FDM) based beam configuration, and/or a spatial division multiplexing (SDM) based beam configuration. In some aspects, for multiple TBs aggregated for transmission either via dynamic or semi-persistent grant, the beam configuration may be, or be included in, a particular reliability configuration that is indicated per TB or TB group.

The plurality of TBs may include a plurality of repetitions of a TB. As used herein, "repetition" refers to a communication that is transmitted more than one time and refers to the initial transmission of that communication or any subsequent retransmission of that communication. Each repetition of the plurality of repetitions may correspond to a shared channel occasion of a plurality of shared channel occasions. Each repetition of the plurality of repetitions may correspond to a redundancy version of TB. The TB specific beam configuration may indicate one or more beams corresponding to the plurality of repetitions of the TB. For example, in some aspects, the TB specific beam configuration may include a first beam configuration corresponding to a first repetition of a TB and a second beam configuration corresponding to a second repetition of the TB. In some aspects, the TB specific beam configuration may include a first beam configuration corresponding to one or more repetitions of a first TB and a second beam configuration corresponding to one or more repetitions of a second TB. In some aspects, a plurality of portions of a TB of the plurality of TBs may correspond to a plurality of portions of a shared channel occasion. The TB specific beam configuration may indicate one or more beams corresponding to the plurality of portions of the shared channel occasion. For example, the multiple repetitions of a TB may be mapped in a TDM manner with a beam that is the same for the multiple repetitions (referred to herein as a "common beam") or different beams across different repetitions, and each repetition may occupy different slots or sub-slots. Alternatively, one TB may be split into different portions of a PDSCH occasion or a PUSCH occasion with a common beam or different TDMed beams across different portions, and each portion may occupy different slots or sub-slots. In some aspects, the multiple repetitions of a TB may be mapped in an FDM manner with common or different beams across different repetitions, and each repetition may occupy different sets of resource blocks (RBs) or different OFDM tones of an RB. Alternatively, one TB may be split into different portions of a PDSCH occasion or a PUSCH occasion with a common beam or different FDMed beams across different portions, and each portion may occupy different sets of RBs or different tones of an RB.

In some aspects, a TB of the plurality of TBs may correspond to at least one of a plurality of spatial layers or a plurality of antenna ports. The TB specific beam configuration may indicate a plurality of beams. Each of the plurality of beams may correspond to a spatial layer or an antenna port. For example, in some aspects, a TB may have multiple spatial layers or antenna ports with different sets of layers and/or ports transmitted by different beams.

In some aspects, a TB of the plurality of TBs may correspond to at least one of a spatial layer or an antenna port, and the TB specific beam configuration may indicate a plurality of beams, where two or more of the plurality of beams correspond to a spatial layer or an antenna port. In some aspects, a TB may include a single spatial layer or antenna or multiple spatial layers or antenna ports with each layer and/or port simultaneously transmitted by different beams.

In some aspects, the UE 402 and/or network node 404 may transmit the plurality of TBs by transmitting a repetition of a first TB serially with a repetition of a second TB in at least one of a time domain or a frequency domain. For example, the multiple TBs may be mapped in a sequential manner. In some aspects, the UE 402 and/or the network node 404 may interlace a repetition of a first TB with a repetition of a second TB in at least one of a time domain or a frequency domain. For example, the multiple TBs may be mapped in a cyclical manner. In some aspects, a first beam configuration may correspond to the repetition of the first TB and a second beam configuration may correspond to the repetition of the second TB.

In some aspects, a TB of the plurality of TBs may correspond to a subset of a set of spatial resources. The set of spatial resources may include at least one of a plurality of spatial layers or a plurality of antenna ports, and the TB specific beam configuration may indicate a plurality of sets of beams, where a set of the plurality of sets of beams may correspond to the subset of the set of spatial resources. For example, in some aspects, a TB may be transmitted using multiple spatial layers or antenna ports with each subset of layers and/or antenna ports transmitted by a different set of beams.

In some aspects, the TB specific beam configuration may include at least one beam indication having at least one beam indication type. The at least one beam indication type may be a Type 1 indication, which is a joint downlink and uplink TCI state that indicates a beam for at least one downlink channel and/or reference signal and one uplink channel and/or reference signal. The at least one beam indication type may be a Type 2 indication, which is a separate downlink TCI state that indicates a beam for at least two downlink channels and/or reference signals. The at least one beam indication type may be a Type 3 indication, which is a separate uplink TCI state that indicates a beam for at least two uplink channels and/or reference signals. The at least one beam indication type may be a Type 4 indication, which is a single-channel downlink TCI state that indicates a beam for a single downlink channel and/or reference signal. The at least one beam indication type may be a Type 5 indication, which is a single-channel uplink TCI state or a single-channel spatial relation information indication that indicates a beam for a single uplink channel and/or reference signal. In some aspects, the reference signal in a TCI state may provide quasi co-location (QCL) information for downlink receptions. In some aspects, the reference signal TCI state may provide spatial transmit filter information for uplink transmissions.

In some aspects, the TB specific beam configuration may be carried in a DCI transmission that schedules a transmission of the plurality of TBs, a medium access control control element (MAC-CE) that activates a semi-persistent periodic transmission of the plurality of TBs, and/or an RRC message that schedules a transmission of the plurality of the TBs. In some aspects, the TB specific beam configuration may include a first beam configuration corresponding to a first TB or a first TB group and a second beam configuration corresponding to a second TB or a second TB group. For example, the beam indication for the at least one beam in the beam configuration per TB or TB group may be indicated in a DCI transmission scheduling a dynamic transmission of the multiple TBs, a DCI and/or MAC-CE activating a semi-persistent periodic transmission of the multiple TBs, and/or an RRC message and/or MAC-CE configuring a periodic transmission of the multiple TBs.

In some aspects, one beam configuration may be indicated and applied to all TBs in a resource grant. For example, if a DCI indicates a beam configuration with SDM of different beams for different layers and/or ports of the PDSCH or PUSCH, the beam configuration may be applied to each TB in the same grant scheduled by the DCI. In some aspects, different beam configurations may be applied to different TBs or TB groups, and may have different sets of beams. For example, a first TB and a fourth TB may have single beam transmission indicated by one beam configuration, while a second TB and a third TB may have two TDMed beams indicated by another beam configuration. In another example, a DCI may indicate a beam configuration with two TDMed beams only applied to a first TB or a third TB, and the remaining TBs scheduled by the DCI may use a default beam configuration. In some aspects, the default beam configuration may have only a single beam, and the single beam may be the first beam in the indicated beam configuration with two TDMed beams. In some aspects, different beam configurations may be applied for different TBs or TB groups, but have same set of beams. For example, the first TB and fourth TB may have a beam configuration of two SDMed beams, while the second TB and third TB may have a beam configuration of same two beams but in a TDM manner. In this way, the same two TCI states or corresponding TCI codepoint may be indicated for all TBs of different multiplexing manners. In some aspects, the network node 404 may transmit, and the UE 402 may receive, (e.g., via at least one of an RRC message or a MAC-CE, such as the RRC and/or MAC-CE carrying the TB specific configuration) a mapping indication indicating a mapping between a plurality of TCI states and a plurality of corresponding TCI codepoints in the DCI transmission. In some aspects, if there are multiple beams in the beam configuration per TB or TB group, the corresponding multiple TCI states may be mapped to a TCI codepoint indicated in the scheduling and/or activating DCI.

In some aspects, the network node 404 may transmit, and the UE 402 may receive a plurality of TB specific feedback configurations. Each TB specific feedback configuration of the plurality of TB specific feedback configurations may indicate one or more beams corresponding to a feedback transmission, of a plurality of feedback transmissions, associated with at least one of the TB or the TB group. For example, in some aspects, for multiple TBs in a multiple PDSCH transmission involving either a dynamic or semi-persistent grant, a separate acknowledgement/negative acknowledgement (A/N) feedback configuration with a corresponding beam configuration may be indicated per TB or TB group to carry the corresponding A/N feedback.

In some aspects, the plurality of TB specific feedback configurations may include at least one of a TDM based beam configuration, an FDM based beam configuration, or an SDM based beam configuration. The plurality of TB specific feedback configurations may include at least one of a high reliability feedback configuration indicating a first set of feedback parameters or a low reliability feedback configuration indicating a second set of feedback parameters. “High” and “low” as used herein refer to configurations that are distinguishable from one another. For example, a reliability that is high is not a reliability that is low, and vice-versa. In some aspects, the “high” and “low” may be a priority indicator for a physical channel. In some aspects, a high reliability feedback configuration may be a feedback configuration that indicates a number of beams that satisfies a threshold, a number of beams per feedback transmission that satisfies a threshold, a number of beams having at least a threshold degree of diversity, and/or any other criterion that may be established in an implementation or a wireless communication standard to be used to distinguish a high reliability feedback configuration from a low reliability feedback configuration.

In some aspects, the UE 402 may apply at least one of the high reliability feedback configuration or the low reliability feedback configuration based at least in part on at least one uplink physical level priority indicator. The at least one uplink physical layer priority indicator may include two separate identifiers independently or a single identifier jointly mapped to two values. The first set of feedback parameters may include a first physical uplink control channel (PUCCH) resource, a first PUCCH starting time, a first repetition number, and/or a first beam sweep pattern. Similarly, the second set of feedback parameters may include a second PUCCH resource, a second PUCCH starting time, a second repetition number, and/or a second beam sweep pattern. The first and second beam sweep pattern may be determined by the beam configurations corresponding to the TBs with feedback in the PUCCH resources.

In some aspects, each PUCCH configuration and/or resource may have a corresponding uplink physical layer priority indicator, which may be explicitly indicated or implicitly determined by a signaled order. For example, the first and second configurations indicated to the UE 402 may have uplink physical layer priorities of high and low, respectively. In some aspects, the PUCCH starting time may be determined based at least in part on a last PDSCH occasion among all the TBs or a last PDSCH carrying a TB in a TB group mapped to the corresponding feedback configuration. The two PUCCH resources and the corresponding two PUCCH starting times may be indicated by two separate indicators independently or a single indicator jointly mapped to the two values.

In some aspects, the plurality of TB specific feedback configurations may include a first TB specific feedback configuration associated with a first TB group of the plurality of TB groups, where a first group index corresponds to the first TB group and a second TB specific feedback configuration associated with a second TB group of the plurality of TB groups, where a second group index corresponds to the second TB group. For example, in some aspects, for signaling the separate TB groups, each TB or its associated parameters, such as a HARQ process ID or TDRA ID, may be mapped to a group index. The first group index or the second group index may be associated with the TB of the plurality of TBs based at least in part on at least one of a scheduled TB order or a signaled TB order. For example, a first set of TBs may be in a group 0, while a remaining set of TBs may be in a group 1, where the number of TBs in the first set may be signaled to the UE 402 and/or specified in a wireless communication standard.

In some aspects, a mapping between a feedback configuration of the plurality of TB specific feedback configurations and a TB group of the plurality of TB groups may be based at least in part on at least one of a signaled order or a feedback configuration identifier that corresponds to a TB group identifier. For example, the mapping between an A/N configuration and a TB group may be implicitly determined based on the signaled order. For example, the first A/N configuration may map to a group 0, and a second A/N configuration may map to a group 1. In some aspects, the mapping may be implicitly determined based on an A/N configuration ID and the TB group ID. For example, the A/N config ID 0 may map to the TB group 0. In some aspects, the mapping may be determined based on an explicit linkage. For example, a TB group 0 may be indicated in the A/N configuration with the first signaled order or with ID 0.

In some aspects, the TB specific beam configuration may indicate a default PDSCH beam fixed across a plurality of slots to be used for receiving downlink communications from a TRP. For multiple TBs being transmitted using multi-PDSCH occasions, a single default PDSCH beam fixed across slots may be used at least in single TRP operation, and one default PDSCH beam fixed across slots may be used for each TRP at least in multi-TRP operation.

In some aspects, the UE 402 may receive a single DCI transmission that schedules the plurality of TBs in a plurality of PDSCH occasions, where an offset between the DCI transmission and a first PDSCH occasion of the plurality of PDSCH occasions may be greater than or equal to a beam switch latency threshold, e.g, timeDurationForQCL. In some aspects, the UE 402 may receive a single DCI transmission that schedules the plurality of TBs in a plurality of PDSCH occasions, and the UE 402 may apply a default beam to a PDSCH occasion when the offset between the DCI transmission and the PDSCH occasion of the plurality of PDSCH occasions is less than a beam switch latency threshold, e.g, timeDurationForQCL. In some aspects, the UE 402 may receive a single DCI transmission that schedules the plurality of TBs in a plurality of PDSCH occasions, and the UE 402 may apply a default beam to all PDSCH occasion when the offset between the DCI transmission and a first PDSCH occasion of the plurality of PDSCH occasions may be less than a beam switch latency threshold, e.g, timeDurationForQCL. In some aspects, the default PDSCH beam may be based at least in part on a QCL rule for receiving a CORESET associated with the TRP in a downlink bandwidth part. For example, at least if multi-TB multi-PDSCH transmission is enabled (e.g., indicated by a flag from the network node 404 and/or a UE capability), for single TRP operation, the default PDSCH beam may follow the QCL assumption for receiving a particular CORESET (e.g., the beam with the lowest or highest ID in an active downlink bandwidth part (BWP)), and for multi-TRP operation, the default PDSCH beam per TRP may follow the QCL assumption for receiving a particular CORESET associated with that TRP (e.g., the CORESET with lowest or highest ID among those with the CORESETPoolIndex associated with that TRP in the active downlink BWP).

In some aspects, if multi-TB multi-PDSCH transmission is enabled, for single TRP operation, the default PDSCH beam may be indicated by a particular TCI state (e.g., the activated PDSCH TCI state with a lowest or highest ID in an active downlink BWP). For multi-TRP operation, the default PDSCH beam per TRP may be indicated by a particular TCI state associated with that TRP (e.g., the first TCI state of the TCI codepoint with a lowest index among all TCI codepoints mapped to two TCI states in an active BWP). In some aspects, if multi-TB multi-PDSCH transmission is enabled, for single TRP operation, the indicated PDSCH beam for all PDSCH reception may be identical to the fixed single default PDSCH beam. For multi-TRP operation, the indicated PDSCH beam for all PDSCH reception per TRP may be identical to the fixed single default PDSCH beam per TRP.

As shown by reference number 408, the UE 402 and the network node 404 may communicate the plurality of TBs based at least in part on the TB specific beam configuration. For example, the UE 402 may transmit the plurality of TBs to the network node 404 or receive the plurality of TBs from the network node 404. In some aspects, the UE 402 and/or the network node 404 may transmit the plurality of TBs based at least in part on at least one of time division multiplexing the plurality of repetitions across a plurality of slots or a plurality of sub-slots or frequency division multiplexing the plurality of repetitions across a plurality of sets of resource blocks (RBs) or a plurality of tones of a single RB.

In some aspects, for example, the TBs may be transmitted using a TDM based beam configuration, in which a TB may be repeated by TDMed PDSCH occasions or PUSCH occasions with the same or different beams across different repetitions, which may occupy different slots or sub-slots. In some aspects, the TBs may be transmitted using an FDM based beam configuration in which a TB may be repeated by FDMed PDSCH occasions or PUSCH occasions with a same or different beams across different repetitions, which may occupy different sets of RBs or different tones of a same RB.

As indicated above, FIG. 4 is provided as an example. Other examples may differ from what is described with respect to FIG. 4.

FIG. 5 is a diagram illustrating an example 500 of a TB specific beam configuration for multiple TB transmission, in accordance with the present disclosure. Example 500 depicts an illustrative signaling implementation in which a beam configuration is applied to all TBs in the same resource allocation. For example, as shown, the DCI may indicate a beam configuration as SDM with different beams for different layers and/or ports and in example 500, each TB in the grant scheduled by the DCI may use the same beam configuration. In some aspects, for example, a TB of the plurality of TBs may correspond to at least one of a spatial layer or an antenna port, and the TB specific beam configuration may indicate a plurality of beams, where two or more of the plurality of beams correspond to a spatial layer or an antenna port.

In some aspects, for example, for multi-downlink shared channel (e.g., PDSCH) scheduling for multi-TRP operations, the DCI may include a single DCI field (e.g., a "transmission configuration indication" field) that indicates one or two TCI states associated with a code point for single DCI-based multi-TRP operations. If two TCI states are indicated by the single DCI field, association rules may be used to apply the two TCI states for each downlink shared channel transmission scheduled by the DCI. In this manner, as shown in FIG. 5, a same beam configuration indicated in the DCI may be applied to each TB scheduled in the same scheduling grant as a result of the same beam configuration being applied to the multiple downlink shared channels.

In some aspects, a TB of the plurality of TBs may be carried by an individual downlink shared channel (e.g., PDSCH) of a plurality of scheduled downlink shared channels or an individual uplink shared channel (e.g., PUSCH) of a plurality of scheduled uplink shared channels. Each of the plurality of scheduled downlink shared channels and/or each of the plurality of scheduled uplink shared channels may be scheduled by the same DCI. The beam configuration may be applied to the individual scheduled downlink shared channels and/or the individual uplink shared channels and, as a result, the same beam configuration may apply to each TB of the plurality of TBs.

In some aspects, the single DCI field may indicate only one TCI state associated with a code point for multi-DCI based multi-TRP operations. In these aspects, as above, the same beam configuration may be applied to all of the TBs in the same grant. In some aspects, MAC-CE signaling may be used for activation and/or deactivation of the one or two TCI states. In some aspects, a TDRA table for multi-downlink shared channel scheduling may not configure the UE with a higher layer repetition number parameter (e.g., repetitionNumber). In some aspects, the beam configuration may be indicated to the UE using the DCI, another DCI, a MAC-CE, and/or an RRC message, among other examples.

As indicated above, FIG. 5 is provided as an example. Other examples may differ from what is described with respect to FIG. 5.

Figure 6:
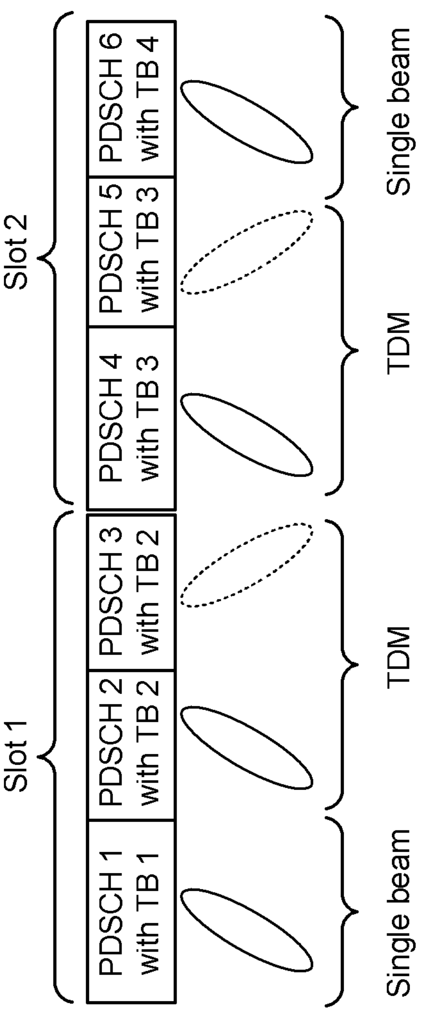

FIG. 6 is a diagram illustrating an example 600 of TB specific beam configuration for multiple TB transmission, in accordance with the present disclosure. Example 600 depicts an illustrative signaling implementation in which different beam configurations are applied to different TBs or TB groups. The different beam configurations may indicate different sets of beams. For example, as shown, TB1 and TB4 have a single beam transmission, while TB2 and TB3 have a TDMed beam sweep configuration. In some aspects, the DCI may indicate that a TDMed beam sweep may only be applied to TB2 and TB3, and the remaining TBs will implicitly use a default beam configuration. The default beam configuration may be a single beam transmission, where the single beam may be the first beam in the indicated TDMed beam sweep pattern.

As indicated above, FIG. 6 is provided as an example. Other examples may differ from what is described with respect to FIG. 6.

Figure 7:
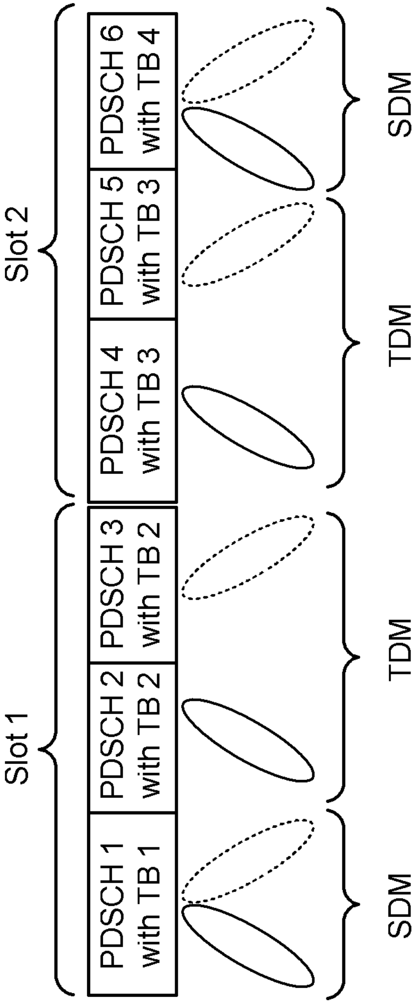

FIG. 7 is a diagram illustrating an example 700 of TB specific beam configuration for multiple TB transmission, in accordance with the present disclosure. Example 700 depicts an illustrative signaling implementation in which different beam configurations are applied for different TBs or TB groups, but have the same set of beams. For example, TB1 and TB4 have an SDMed beam sweep across two beams, while TB2 and TB3 have a TDMed beam sweep across the same two beams. In this case, the same two TCI states or corresponding TCI codepoints may be indicated for all TBs.

As indicated above, FIG. 7 is provided as an example. Other examples may differ from what is described with respect to FIG. 7.

Figure 8:
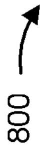
Figure 8:
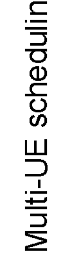
Figure 8:
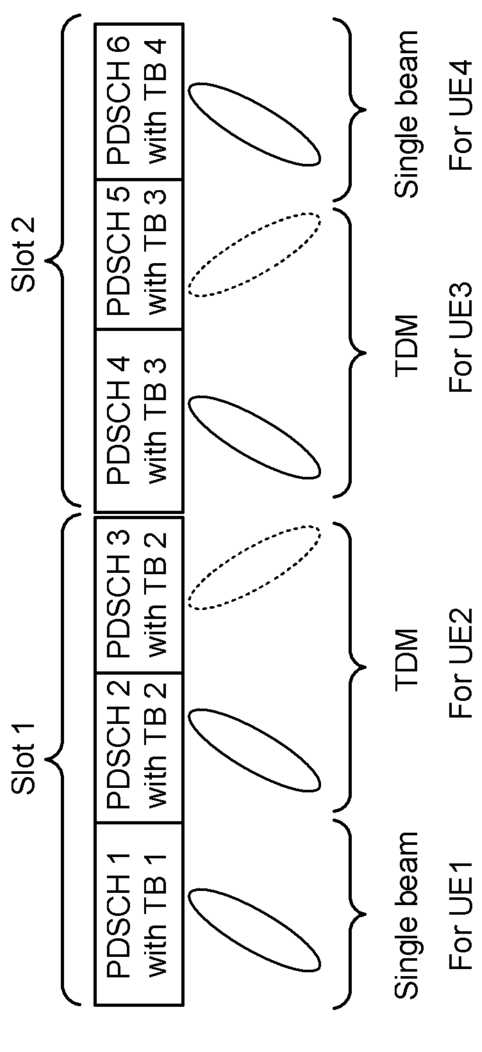

FIG. 8 is a diagram illustrating an example 800 of TB specific beam configuration for multiple TB transmission, in accordance with the present disclosure. Example 800 depicts an illustrative signaling implementation in which a dynamic or semi-persistent grant may contain multiple TBs for different UEs, and those TBs may also have different QoS requirements.

As indicated above, FIG. 8 is provided as an example. Other examples may differ from what is described with respect to FIG. 8.

Figure 9:
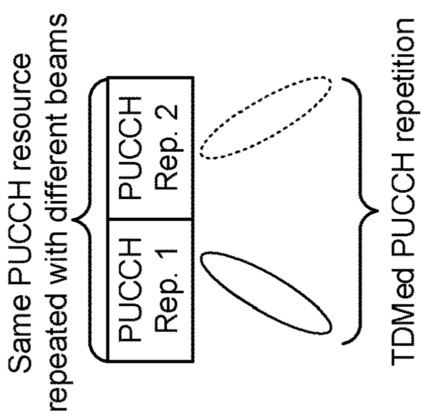
Figure 9:
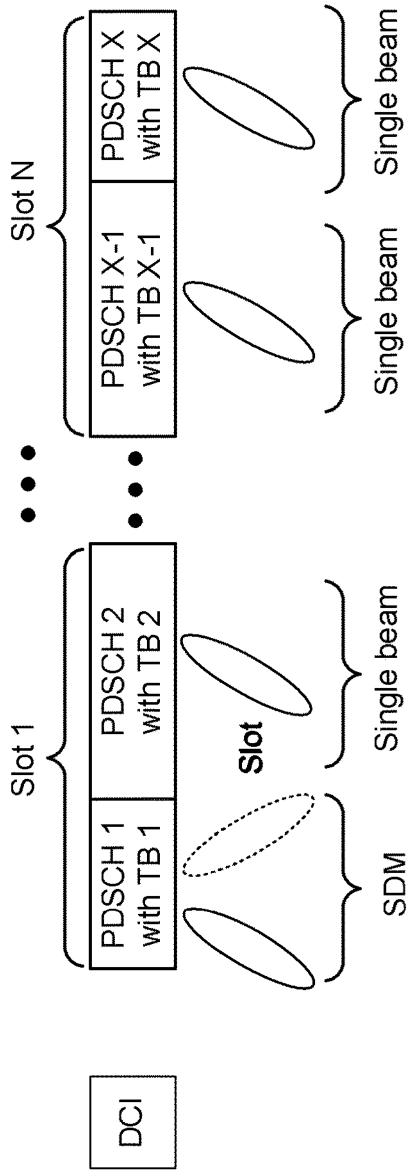

FIG. 9 is a diagram illustrating an example 900 of TB specific beam configuration for multiple TB transmission, in accordance with the present disclosure. Example 900 depicts an illustrative signaling implementation in which a feedback configuration indicates a TDMed PUCCH repetition. In some aspects, for example, a grant may include multiple TBs with different QoS requirements. Thus, the corresponding A/N feedbacks may also have different reliability requirements. In this case, as shown, only TB 1 may be indicated as requiring a high reliability A/N, which may be accomplished using PUCCH repetition across different beams. However, another TB's A/N may be unnecessarily repeated due to the common PUCCH configuration.

As indicated above, FIG. 9 is provided as an example. Other examples may differ from what is described with respect to FIG. 9.

Figure 10:
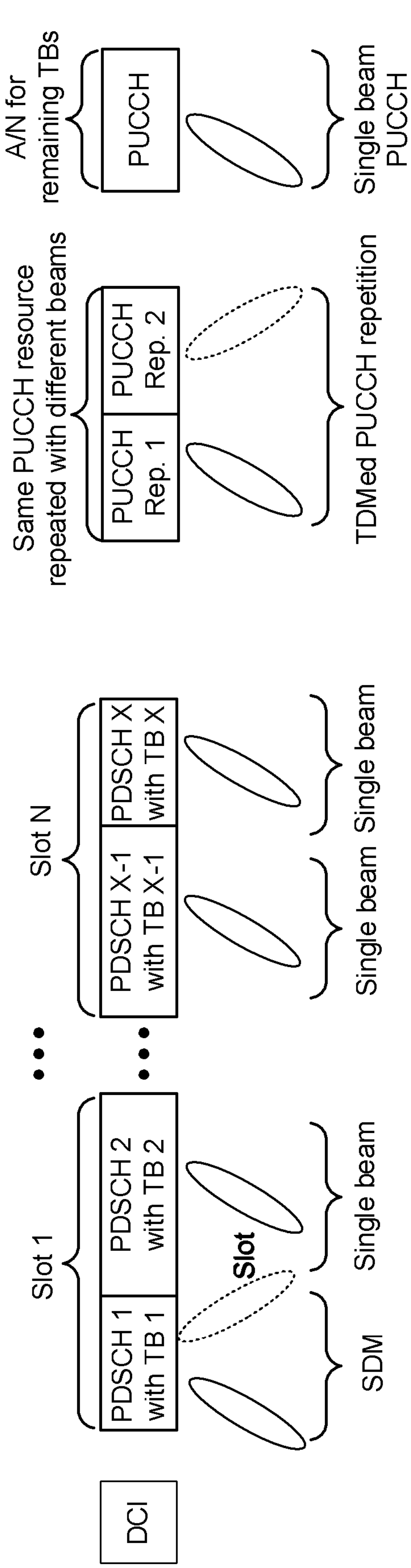

FIG. 10 is a diagram illustrating an example 1000 of TB specific beam configuration for multiple TB transmission, in accordance with the present disclosure. Example 1000 depicts an illustrative signaling implementation in which, for multiple TBs with multi-PDSCH transmission, a separate A/N feedback configuration with corresponding beam configuration may be indicated per TB or TB group with similar QoS requirements to carry the corresponding A/N feedback. The beam configuration per A/N configuration may include any individual or combination of the TDM, FDM, and SDM communication schemes described herein.

In addition, the separate A/N configuration per TB or TB group may also be applied to the case of multi-UE multi-TB transmission.

As indicated above, FIG. 10 is provided as an example. Other examples may differ from what is described with respect to FIG. 10.

Figure 11:
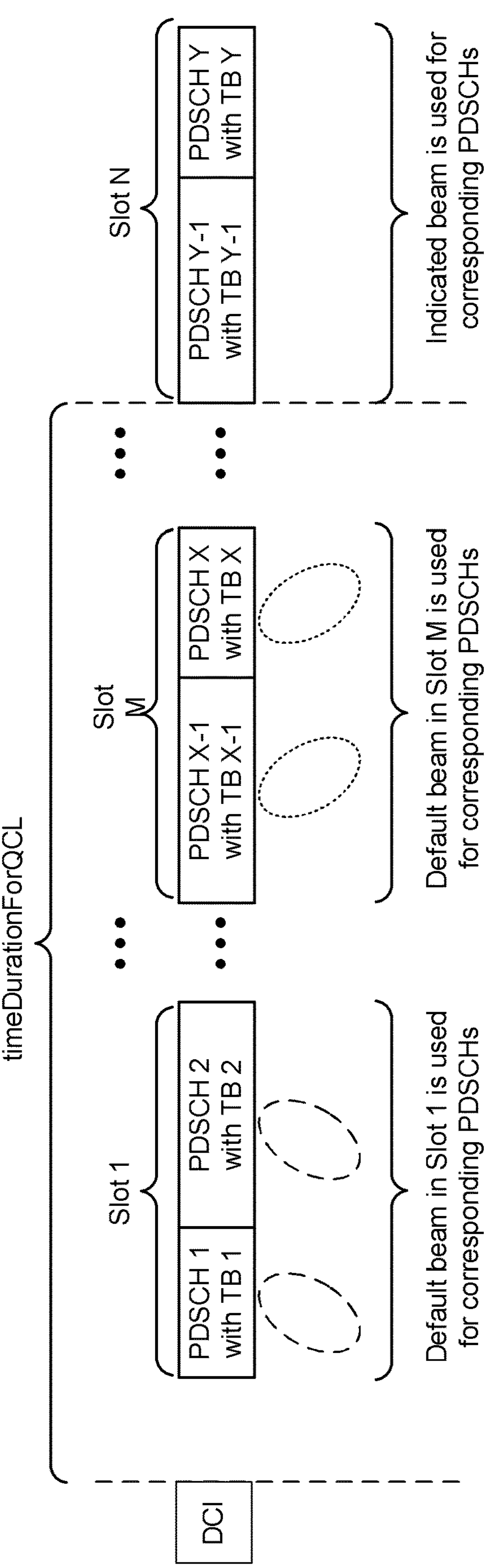

FIG. 11 is a diagram illustrating an example 1100 of TB specific beam configuration for multiple TB transmission, in accordance with the present disclosure. Example 1100 depicts an illustrative signaling implementation in which, for multiple TBs with multi-PDSCH transmission, a separate A/N feedback configuration with corresponding beam configuration may be indicated per TB or TB group with similar QoS requirements to carry the corresponding A/N feedback. In some aspects, beam configuration per A/N configuration may include any individual or combination of the TDM, FDM, and SDM communication schemes described herein. In addition, the separate A/N configuration per TB or TB group may also be applied to the case of multi-UE multi-TB transmission.

As indicated above, FIG. 11 is provided as an example. Other examples may differ from what is described with respect to FIG. 11.

Figure 12:
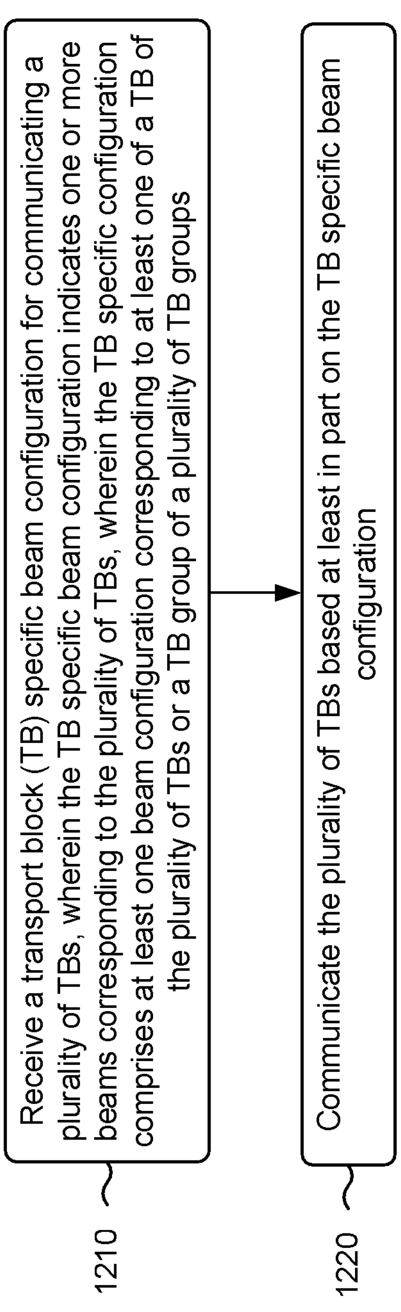
FIGS. 12 and 13 are diagrams illustrating example processes associated with TB specific beam configuration for multiple TB transmission, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with a TB specific beam configuration for multiple TB transmission.

As shown in FIG. 12, in some aspects, process 1200 may include receiving a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups (block 1210). For example, the UE (e.g., using reception component 1402, depicted in FIG. 14) may receive a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups, as described above, for example, with reference to FIGS. 4-11.

As further shown in FIG. 12, in some aspects, process 1200 may include communicating the plurality of TBs based at least in part on the beam configuration (block 1220). For example, the UE (e.g., using reception component 1402 and/or transmission component 1404, depicted in FIG. 14) may communicate the plurality of TBs based at least in part on the TB specific beam configuration, as described above, for example, with reference to FIGS. 4-11.

Process 1200 may include additional aspects, such as any single aspect or any combination of aspects described below and/or in connection with one or more other processes described elsewhere herein.

In a first aspect, the TB specific beam configuration comprises at least one of a TDM based beam configuration, an FDM based beam configuration, or an SDM based beam configuration.

In a second aspect, the plurality of TBs comprises a plurality of repetitions of a TB, each repetition of the plurality of repetitions corresponding to a shared channel occasion of a plurality of shared channel occasions, and the one or more beams correspond to the plurality of repetitions of the TB.

In a third aspect, communicating the plurality of TBs comprises at least one of time division multiplexing the plurality of repetitions across a plurality of slots or a plurality of sub-slots, or frequency division multiplexing the plurality of repetitions across a plurality of sets of RBs or a plurality of tones of a single RB.

In a fourth aspect, a plurality of portions of a TB of the plurality of TBs corresponds to a plurality of portions of a shared channel occasion, and the one or more beams correspond to the plurality of portions of the shared channel occasion.

In a fifth aspect, communicating the plurality of TBs comprises at least one of time division multiplexing the plurality of portions of the TB across a plurality of slots or a plurality of sub-slots, or frequency division multiplexing the plurality of portions of the TB across a plurality of sets of RBs or a plurality of tones of a single RB.

In a sixth aspect, the TB of the plurality of TBs corresponds to at least one of a plurality of spatial layers or a plurality of antenna ports, wherein the TB specific beam configuration indicates a plurality of beams, wherein each of the plurality of beams corresponds to one of the at least one of the plurality of spatial layers or the plurality of antenna ports.

In a seventh aspect, the TB of the plurality of TBs corresponds to at least one of a spatial layer or an antenna port, wherein the TB specific beam configuration indicates a plurality of beams, wherein two or more of the plurality of beams correspond to one of the at least one of the spatial layer or the antenna port.

In an eighth aspect, communicating the plurality of TBs comprises transmitting a repetition of a first TB serially with a repetition of a second TB in at least one of a time domain or a frequency domain.

In a ninth aspect, communicating the plurality of TBs comprises interlacing a repetition of a first TB with a repetition of a second TB in at least one of a time domain or a frequency domain.

In a tenth aspect, the TB of the plurality of TBs corresponds to a subset of a set of spatial resources, wherein the set of spatial resources comprises at least one of a plurality of spatial layers or a plurality of antenna ports, wherein the TB specific beam configuration indicates a plurality of sets of beams, and wherein a set of the plurality of sets of beams corresponds to the subset of the set of spatial resources.

In an eleventh aspect, the TB specific beam configuration comprises at least one beam indication having at least one beam indication type, wherein the at least one beam indication type comprises at least one of a joint downlink and uplink TCI state, a separate downlink TCI state, a separate uplink TCI state, a single-channel downlink TCI state, a single-channel uplink TCI state, or a single-channel spatial relation information indication.

In a twelfth aspect, receiving the TB specific beam configuration comprises receiving at least one of a DCI transmission that schedules a transmission of the plurality of TBs, a MAC-CE that activates a semi-persistent periodic transmission of the plurality of TBs, or an RRC message that schedules a transmission of the plurality of the TBs.

In a thirteenth aspect, process 1200 includes receiving, via at least one of the RRC message or the MAC-CE, a mapping indication indicating a mapping between a plurality of TCI states and a plurality of corresponding TCI codepoints in the DCI transmission.

In a fourteenth aspect, process 1200 includes receiving a plurality of TB specific feedback configurations, wherein each TB specific feedback configuration of the plurality of TB specific feedback configurations indicates one or more beams corresponding to a feedback transmission, of a plurality of feedback transmissions, associated with at least one of the TB or the TB group.

In a fifteenth aspect, the plurality of TB specific feedback configurations comprises at least one of a TDM based beam configuration, an FDM based beam configuration, or an SDM based beam configuration.

In a sixteenth aspect, the plurality of TB specific feedback configurations comprises at least one of a high reliability feedback configuration indicating a first set of feedback parameters, or a low reliability feedback configuration indicating a second set of feedback parameters.

In a seventeenth aspect, process 1200 includes applying at least one of the high reliability feedback configuration or the low reliability feedback configuration based at least in part on at least one uplink physical layer priority indicator, wherein the first set of feedback parameters comprises at least one of a first PUCCH resource, a first PUCCH starting time, a first repetition number, or a first beam sweep pattern, and wherein the second set of feedback parameters comprises at least one of a second PUCCH resource, a second PUCCH starting time, a second repetition number, or a second beam sweep pattern.

In an eighteenth aspect, the first PUCCH starting time is determined based at least in part on a last PDSCH occasion or a last PDSCH carrying a TB in a TB group mapped to the high reliability feedback configuration.

In a nineteenth aspect, the at least one uplink physical layer priority indicator comprises a first indicator corresponding to the high reliability feedback configuration and a second indicator corresponding to the low reliability feedback configuration.

In a twentieth aspect, the plurality of TB specific feedback configurations include a first TB specific feedback configuration associated with a first TB group of the plurality of TB groups, wherein a first group index corresponds to the first TB group, and a second TB specific feedback configuration associated with a second TB group of the plurality of TB groups, wherein a second group index corresponds to the second TB group.

In a twenty-first aspect, the first group index or the second group index is associated with the TB of the plurality of TBs based at least in part on at least one of a scheduled TB order or a signaled TB order.

In a twenty-second aspect, a mapping between a feedback configuration of the plurality of TB specific feedback configurations and a TB group of the plurality of TB groups is based at least in part on at least one of a signaled order, or a feedback configuration identifier that corresponds to a TB group identifier.

In a twenty-third aspect, the TB specific beam configuration indicates a default PDSCH beam fixed across a plurality of slots to be used for receiving downlink communications from a TRP.

In a twenty-fourth aspect, the TB specific beam configuration indicates an additional default PDSCH beam fixed across the plurality of slots to be used for receiving downlink communications from an additional TRP.

In a twenty-fifth aspect, process 1200 includes receiving a single DCI transmission that schedules the plurality of TBs in a plurality of PDSCH occasions, wherein an offset between the DCI transmission and a first PDSCH occasion of the plurality of PDSCH occasions is greater than or equal to a beam switch latency threshold.

In a twenty-sixth aspect, the default PDSCH beam is based at least in part on a QCL rule for receiving a CORESET associated with the TRP and corresponding to an active downlink bandwidth part.

In a twenty-seventh aspect, the default PDSCH beam is based at least in part on a TCI state associated with the TRP and corresponding to an active downlink bandwidth part.

In a twenty-eighth aspect, the one or more beams corresponding to the at least one of the TB or the TB group comprise the default PDSCH beam based at least in part on a determination that multiple-TB multiple PDSCH transmission operation is enabled.

In a twenty-ninth aspect, process 1200 includes receiving DCI comprising a single DCI field that indicates at least one TCI state associated with a code point, wherein communicating the plurality of TBs comprises applying the TB specific beam configuration to each TB of the plurality of TBs, and the plurality of TBs correspond to a scheduling grant indicated by the DCI.

In a thirtieth aspect, the at least one TCI state consists of only one TCI state.

In a thirty-first aspect, the at least one TCI state consists of two TCI states.

In a thirty-second aspect, at least one TB of the plurality of TBs corresponds to at least one of a spatial layer or an antenna port.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
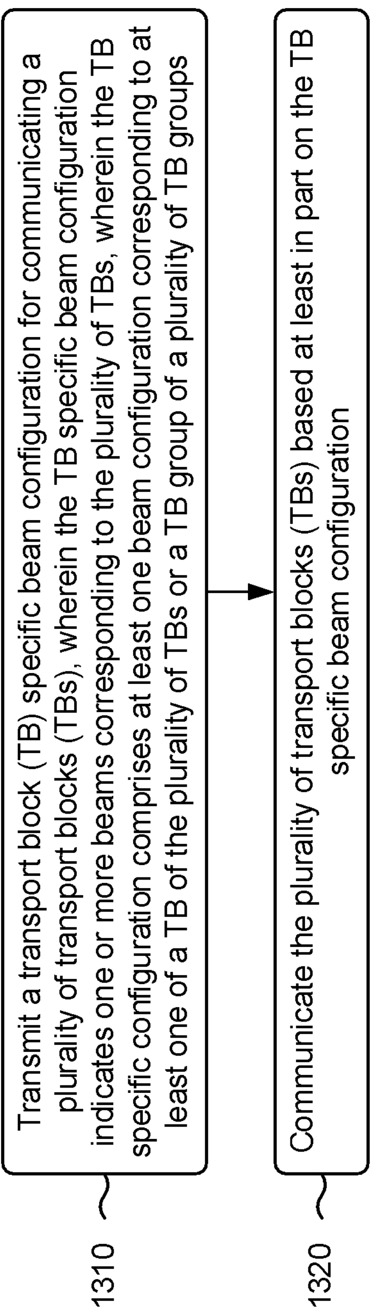

FIG. 13 is a diagram illustrating an example process 1300 performed, for example, by a network node, in accordance with the present disclosure. Example process 1300 is an example where the network node (e.g., network node 404) performs operations associated with a TB specific beam configuration for multiple TB transmission.

As shown in FIG. 13, in some aspects, process 1300 may include transmitting a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups (block 1310). For example, the network node (e.g., using transmission component 1504, depicted in FIG. 15) may transmit a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups, as described above, for example, with reference to FIGS. 4-11.

As further shown in FIG. 13, in some aspects, process 1300 may include communicating the plurality of TBs based at least in part on the beam configuration (block 1320). For example, the network node (e.g., using reception component 1502 and/or transmission component 1504, depicted in FIG. 15) may communicate the plurality of TBs based at least in part on the TB specific beam configuration, as described above, for example, with reference to FIGS. 4-11.

Process 1300 may include additional aspects, such as any single aspect or any combination of aspects described below and/or in connection with one or more other processes described elsewhere herein.

In a first aspect, the TB specific beam configuration comprises at least one of a TDM based beam configuration, an FDM based beam configuration, or an SDM based beam configuration.

In a second aspect, the plurality of TBs comprises a plurality of repetitions of a TB, each repetition of the plurality of repetitions corresponding to a shared channel occasion of a plurality of shared channel occasions, and the one or more beams correspond to the plurality of repetitions of the TB.

In a third aspect, communicating the plurality of TBs comprises at least one of time division multiplexing the plurality of repetitions across a plurality of slots or a plurality of sub-slots, or frequency division multiplexing the plurality of repetitions across a plurality of sets of RBs or a plurality of tones of a single RB.

In a fourth aspect, a plurality of portions of a TB of the plurality of TBs corresponds to a plurality of portions of a shared channel occasion, and the one or more beams correspond to the plurality of portions of the shared channel occasion.

In a fifth aspect, communicating the plurality of TBs comprises at least one of time division multiplexing the plurality of portions of the TB across a plurality of slots or a plurality of sub-slots, or frequency division multiplexing the plurality of portions of the TB across a plurality of sets of RBs or a plurality of tones of a single RB.

In a sixth aspect, the TB of the plurality of TBs corresponds to at least one of a plurality of spatial layers or a plurality of antenna ports, wherein the TB specific beam configuration indicates a plurality of beams, wherein each of the plurality of beams corresponds to one of the at least one of the plurality of spatial layers or the plurality of antenna ports.

In a seventh aspect, the TB of the plurality of TBs corresponds to at least one of a spatial layer or an antenna port, wherein the TB specific beam configuration indicates a plurality of beams, wherein two or more of the plurality of beams correspond to one of the at least one of the spatial layer or the antenna port.

In an eighth aspect, communicating the plurality of TBs comprises transmitting a repetition of a first TB serially with a repetition of a second TB in at least one of a time domain or a frequency domain.

In a ninth aspect, communicating the plurality of TBs comprises interlacing a repetition of a first TB with a repetition of a second TB in at least one of a time domain or a frequency domain.

In a tenth aspect, the TB of the plurality of TBs corresponds to a subset of a set of spatial resources, wherein the set of spatial resources comprises at least one of a plurality of spatial layers or a plurality of antenna ports, wherein the TB specific beam configuration indicates a plurality of sets of beams, and wherein a set of the plurality of sets of beams corresponds to the subset of the set of spatial resources.

In an eleventh aspect, the TB specific beam configuration comprises at least one beam indication having at least one beam indication type, wherein the at least one beam indication type comprises at least one of a joint downlink and uplink TCI state, a separate downlink TCI state, a separate uplink TCI state, a single-channel downlink TCI state, a single-channel uplink TCI state, or a single-channel spatial relation information indication.

In a twelfth aspect, transmitting the TB specific beam configuration comprises transmitting at least one of a DCI transmission that schedules a transmission of the plurality of TBs, a MAC-CE that activates a semi-persistent periodic transmission of the plurality of TBs, or an RRC message that schedules a transmission of the plurality of the TBs.

In a thirteenth aspect, process 1300 includes transmitting, via at least one of the RRC message or the MAC-CE, a mapping indication indicating a mapping between a plurality of TCI states and a plurality of corresponding TCI codepoints in the DCI transmission.

In a fourteenth aspect, process 1300 includes transmitting a plurality of TB specific feedback configurations, wherein each TB specific feedback configuration of the plurality of TB specific feedback configurations indicates one or more beams corresponding to a feedback transmission, of a plurality of feedback transmissions, associated with at least one of the TB or the TB group.

In a fifteenth aspect, the plurality of TB specific feedback configurations comprises at least one of a TDM based beam configuration, an FDM based beam configuration, or an SDM based beam configuration.

In a sixteenth aspect, the plurality of TB specific feedback configurations comprises at least one of a high reliability feedback configuration indicating a first set of feedback parameters, or a low reliability feedback configuration indicating a second set of feedback parameters.

In a seventeenth aspect, process 1300 includes applying at least one of the high reliability feedback configuration or the low reliability feedback configuration based at least in part on at least one uplink physical layer priority indicator, wherein the first set of feedback parameters comprises at least one of a first PUCCH resource, a first PUCCH starting time, a first repetition number, or a first beam sweep pattern, and wherein the second set of feedback parameters comprises at least one of a second PUCCH resource, a second PUCCH starting time, a second repetition number, or a second beam sweep pattern.

In an eighteenth aspect, the first PUCCH starting time is determined based at least in part on a last PDSCH occasion or a last PDSCH carrying a TB in a TB group mapped to the high reliability feedback configuration.

In a nineteenth aspect, the at least one uplink physical layer priority indicator comprises a first indicator corresponding to the high reliability feedback configuration and a second indicator corresponding to the low reliability feedback configuration.

In a twentieth aspect, the plurality of TB specific feedback configurations include a first TB specific feedback configuration associated with a first TB group of the plurality of TB groups, wherein a first group index corresponds to the first TB group, and a second TB specific feedback configuration associated with a second TB group of the plurality of TB groups, wherein a second group index corresponds to the second TB group.

In a twenty-first aspect, the first group index or the second group index is associated with the TB of the plurality of TBs based at least in part on at least one of a scheduled TB order or a signaled TB order.

In a twenty-second aspect, a mapping between a feedback configuration of the plurality of TB specific feedback configurations and a TB group of the plurality of TB groups is based at least in part on at least one of a signaled order, or a feedback configuration identifier that corresponds to a TB group identifier.

In a twenty-third aspect, the TB specific beam configuration indicates a default PDSCH beam fixed across a plurality of slots to be used for receiving downlink communications from a TRP.

In a twenty-fourth aspect, the TB specific beam configuration indicates an additional default PDSCH beam fixed across the plurality of slots to be used for receiving downlink communications from an additional TRP.

In a twenty-fifth aspect, process 1300 includes transmitting a single DCI transmission that schedules the plurality of TBs in a plurality of PDSCH occasions, wherein an offset between the DCI transmission and a first PDSCH occasion of the plurality of PDSCH occasions is greater than or equal to a beam switch latency threshold.

In a twenty-sixth aspect, the default PDSCH beam is based at least in part on a QCL rule for receiving a CORESET associated with the TRP and corresponding to an active downlink bandwidth part.

In a twenty-seventh aspect, the default PDSCH beam is based at least in part on a TCI state associated with the TRP and corresponding to an active downlink bandwidth part.

In a twenty-eighth aspect, the one or more beams corresponding to the at least one of the TB or the TB group comprise the default PDSCH beam based at least in part on a determination that multiple-TB multiple PDSCH transmission operation is enabled.

In a twenty-ninth aspect, process 1300 includes transmitting DCI comprising a single DCI field that indicates at least one TCI state associated with a code point, wherein receiving the plurality of TBs comprises receiving the plurality of TBs based at least in part on an application of the TB specific beam configuration to each TB of the plurality of TBs, wherein the plurality of TBs correspond to a scheduling grant indicated by the DCI.

In a thirtieth aspect, the at least one TCI state consists of only one TCI state.

In a thirty-first aspect, the at least one TCI state consists of two TCI states.

In a thirty-second aspect, at least one TB of the plurality of TBs corresponds to at least one of a spatial layer or an antenna port.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
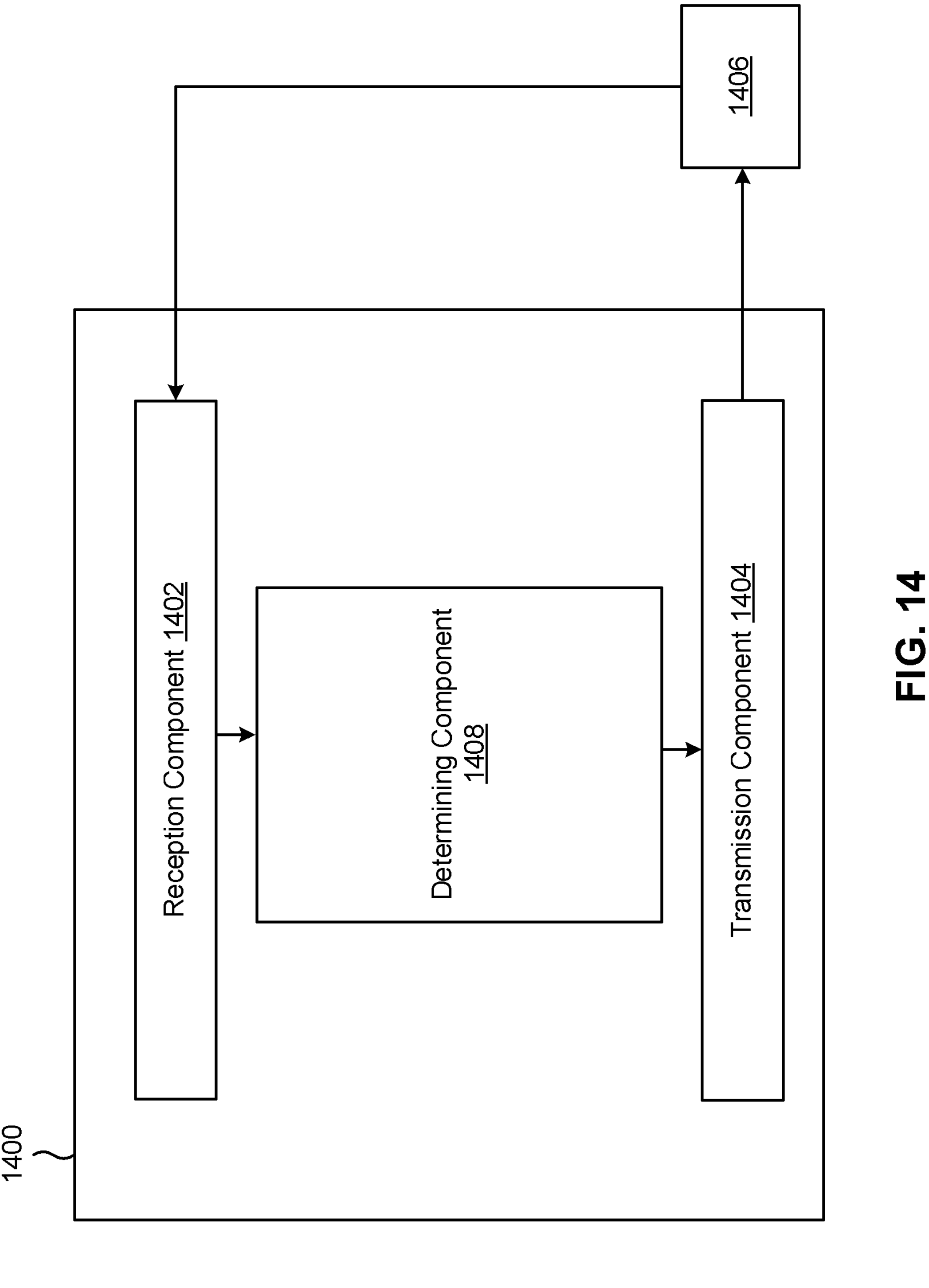
FIGS. 14 and 15 are block diagrams of example apparatuses for wireless communication, in accordance with the present disclosure.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a network node, or another wireless communication device) using the reception component 1402 and the transmission component 1404. As further shown, the apparatus 1400 may include a determination component 1408.

In some aspects, the apparatus 1400 may be configured to perform one or more operations described herein in connection with FIGS. 4-11. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The reception component 1402 may receive a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups. The reception component 1402 and/or the transmission component 1404 may communicate the plurality of TBs based at least in part on the beam configuration.

The reception component 1402 may receive, via at least one of the RRC message or the MAC-CE, a mapping indication indicating a mapping between a plurality of TCI states and a plurality of corresponding TCI codepoints in the DCI transmission.

The reception component 1402 may receive a plurality of TB specific feedback configurations, wherein each TB specific feedback configuration of the plurality of TB specific feedback configurations indicates one or more beams corresponding to a feedback transmission, of a plurality of feedback transmissions, associated with at least one of the TB or the TB group.

The determination component 1408 may apply at least one of the high reliability feedback configuration or the low reliability feedback configuration based at least in part on at least one uplink physical layer priority indicator, wherein the first set of feedback parameters comprises at least one of: a first PUCCH resource, a first PUCCH starting time, a first repetition number, or a first beam sweep pattern, and wherein the second set of feedback parameters comprises at least one of: a second PUCCH resource, a second PUCCH starting time, a second repetition number, or a second beam sweep pattern. In some aspects, the determination component 1408 may include one or more antennas, a demodulator, a MIMO detector, a receive processor, a controller/processor, a memory, or a combination thereof, of the UE described above in connection with FIG. 2.

The reception component 1402 may receive a single DCI transmission that schedules the plurality of TBs in a plurality of PDSCH occasions, wherein an offset between the DCI transmission and a first PDSCH occasion of the plurality of PDSCH occasions is greater than or equal to a beam switch latency threshold.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
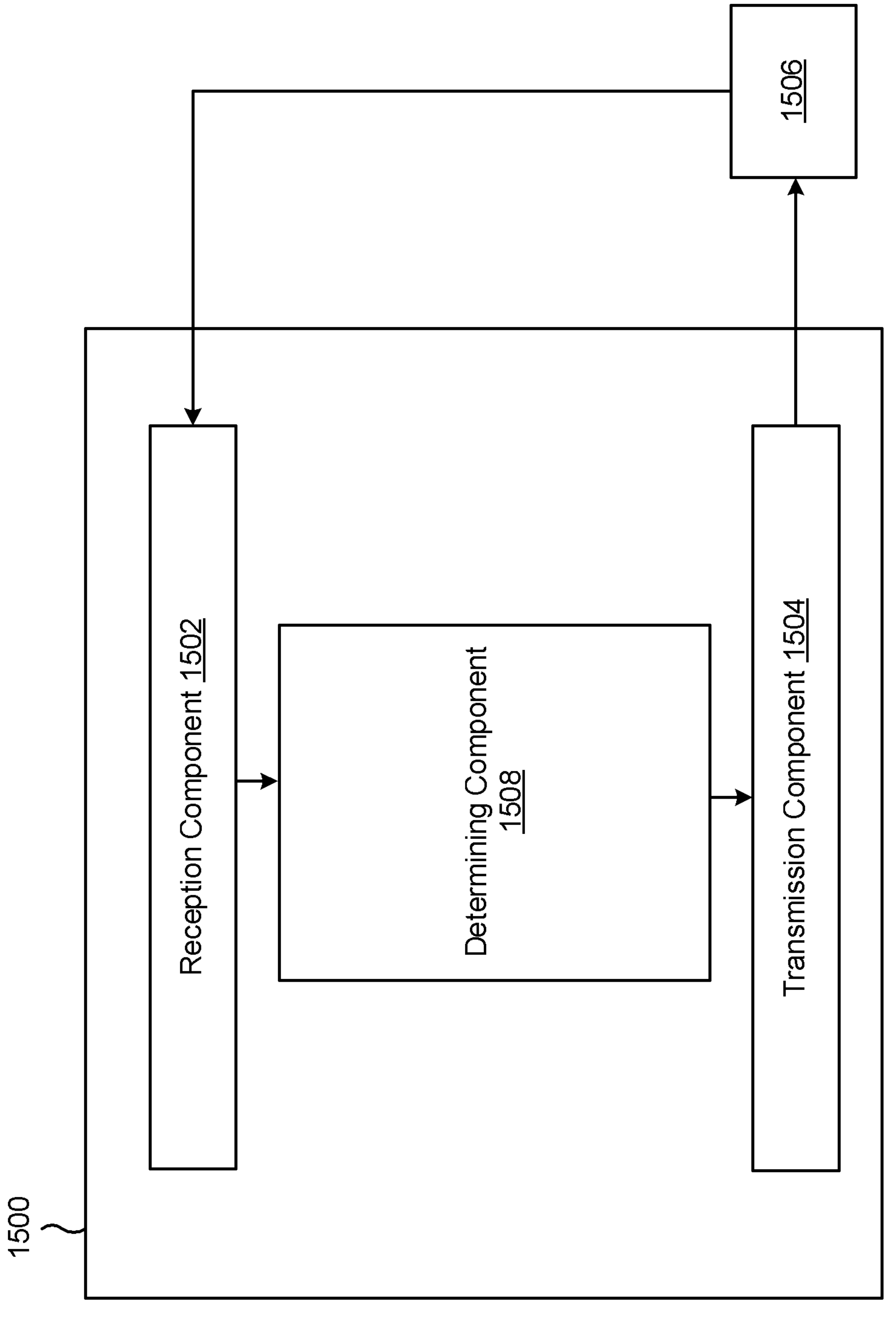

FIG. 15 is a block diagram of an example apparatus 1500 for wireless communication. The apparatus 1500 may be a network node, or a network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a determination component 1508.

In some aspects, the apparatus 1500 may be configured to perform one or more operations described herein in connection with FIGS. 4-11. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the base station described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a demodulator, a AMMO detector, a receive processor, a controller/processor, a memory, or a combination thereof, of the base station described above in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the base station described above in connection with FIG. 2. In some aspects, the transmission component 1504 may be co-located with the reception component 1502 in a transceiver.

The transmission component 1504 may transmit a TB specific beam configuration for communicating a plurality of TBs, wherein the TB specific beam configuration indicates one or more beams corresponding to the plurality of TBs, wherein the TB specific configuration comprises at least one beam configuration corresponding to at least one of a TB of the plurality of TBs or a TB group of a plurality of TB groups. The reception component 1502 and/or the transmission component 1504 may communicate the plurality of TBs based at least in part on the beam configuration.

The transmission component 1504 may transmit, via at least one of the RRC message or the MAC-CE, a mapping indication indicating a mapping between a plurality of TCI states and a plurality of corresponding TCI codepoints in the DCI transmission.

The transmission component 1504 may transmit a plurality of TB specific feedback configurations, wherein each TB specific feedback configuration of the plurality of TB specific feedback configurations indicates one or more beams corresponding to a feedback transmission, of a plurality of feedback transmissions, associated with at least one of the TB or the TB group.

The determination component 1508 may apply at least one of the high reliability feedback configuration or the low reliability feedback configuration based at least in part on at least one uplink physical layer priority indicator, wherein the first set of feedback parameters comprises at least one of: a first PUCCH resource, a first PUCCH starting time, a first repetition number, or a first beam sweep pattern, and wherein the second set of feedback parameters comprises at least one of: a second PUCCH resource, a second PUCCH starting time, a second repetition number, or a second beam sweep pattern. In some aspects, the determination component 1508 may include one or more antennas, a modulator, a transmit MIMO processor, a transmit processor, a controller/processor, a memory, or a combination thereof, of the base station described above in connection with FIG. 2. In some aspects, the determination component 1508 may include the reception component 1502 and/or the transmission component 1504.

The transmission component 1504 may transmit a single DCI transmission that schedules the plurality of TBs in a plurality of PDSCH occasions, wherein an offset between the DCI transmission and a first PDSCH occasion of the plurality of PDSCH occasions is greater than or equal to a beam switch latency threshold.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
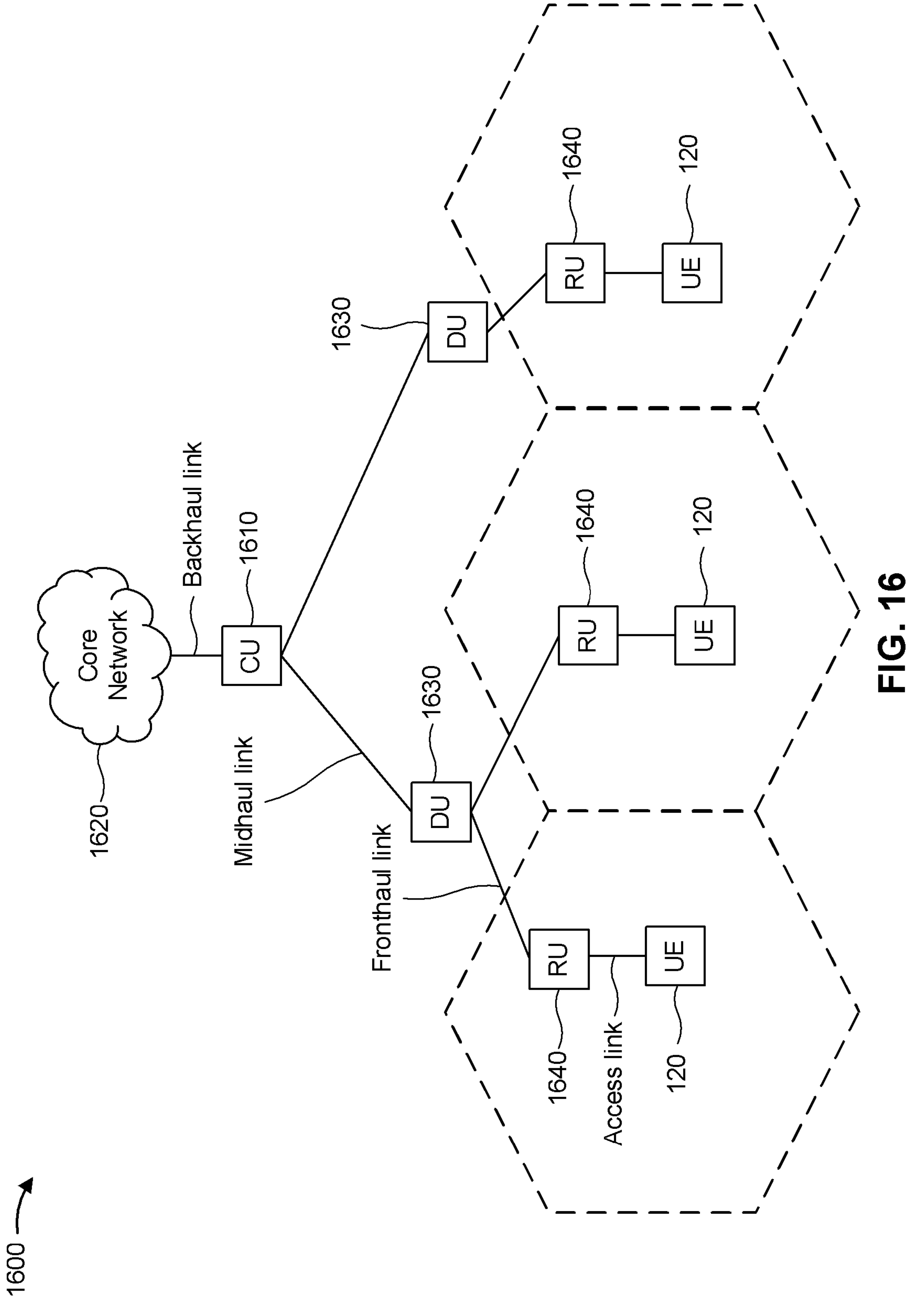
FIG. 16 is a diagram illustrating an example of an open radio access network, in accordance with the present disclosure.

FIG. 16 is a diagram illustrating an example 1600 of an O-RAN architecture, in accordance with the present disclosure. As shown in FIG. 16, the O-RAN architecture may include a control unit (CU) 1610 that communicates with a core network 1620 via a backhaul link. Furthermore, the CU 1610 may communicate with one or more DUs 1630 via respective midhaul links. The DUs 1630 may each communicate with one or more RUs 1640 via respective fronthaul links, and the RUs 1640 may each communicate with respective UEs 120 via radio frequency (RF) access links. The DUs 1630 and the RUs 1640 may also be referred to as O-RAN DUs (O-DUs) 1630 and O-RAN RUs (O-RUs) 1640, respectively.

In some aspects, the DUs 1630 and the RUs 1640 may be implemented according to a functional split architecture in which functionality of a base station 110 depicted in FIGS. 1 and 2 (e.g., an eNB or a gNB) is provided by a DU 1630 and one or more RUs 1640 that communicate over a fronthaul link. Accordingly, as described herein, a base station 110 may include a DU 1630 and one or more RUs 1640 that may be co-located or geographically distributed. In some aspects, the DU 1630 and the associated RU(s) 1640 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 1630 may correspond to a logical unit that includes one or more base station functions to control the operation of one or more RUs 1640. For example, in some aspects, the DU 1630 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 1610. The RU(s) 1640 controlled by a DU 1630 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 1640 handle all over the air (OTA) communication with a UE 120, and real-time and non-real-time aspects of control and user plane communication with the RU(s) 1640 are controlled by the corresponding DU 1630, which enables the DU(s) 1630 and the CU 1610 to be implemented in a cloud-based RAN architecture.

As indicated above, FIG. 16 is provided as an example. Other examples may differ from what is described with regard to FIG. 16.

The following provides an overview of some Aspects of the present disclosure:

The following provides an overview of some Aspects of the present disclosure:

Aspect 1: A method of wireless communication performed by a user equipment (UE), comprising: receiving a transport block (TB) specific beam configuration for communicating a plurality of TBs, wherein the TB specific beam configuration indicates one or more beams corresponding to at least one of a TB of the plurality of TBs or a TB group of a plurality of TB groups; and communicating the plurality of TBs based at least in part on the TB specific beam configuration.

Aspect 2: The method of Aspect 1, wherein the TB specific beam configuration comprises at least one of: a time division multiplexing (TDM) based beam configuration, a frequency division multiplexing (FDM) based beam configuration, or a spatial division multiplexing (SDM) based beam configuration.

Aspect 3: The method of either of Aspects 1 or 2, wherein the plurality of TBs comprises a plurality of repetitions of a TB, each repetition of the plurality of repetitions corresponding to a shared channel occasion of a plurality of shared channel occasions, and wherein the TB specific beam configuration indicates one or more beams corresponding to the plurality of repetitions of the TB.

Aspect 4: The method of Aspect 3, wherein communicating the plurality of TBs comprises at least one of: time division multiplexing the plurality of repetitions across a plurality of slots or a plurality of sub-slots, or frequency division multiplexing the plurality of repetitions across a plurality of sets of resource blocks (RBs) or a plurality of tones of a single RB.

Aspect 5: The method of any of Aspects 1-4, wherein a plurality of portions of a TB of the plurality of TBs corresponds to a plurality of portions of a shared channel occasion, and wherein the TB specific beam configuration indicates one or more beams corresponding to the plurality of portions of the shared channel occasion.

Aspect 6: The method of Aspect 5, wherein communicating the plurality of TBs comprises at least one of: time division multiplexing the plurality of portions of the TB across a plurality of slots or a plurality of sub-slots, or frequency division multiplexing the plurality of portions of the TB across a plurality of sets of resource blocks (RBs) or a plurality of tones of a single RB.

Aspect 7: The method of any of Aspects 1-6, wherein a TB of the plurality of TBs corresponds to at least one of a plurality of spatial layers or a plurality of antenna ports, wherein the TB specific beam configuration indicates a plurality of beams, wherein each of the plurality of beams corresponds to one of the at least one of the plurality of spatial layers or the plurality of antenna ports.

Aspect 8: The method of any of Aspects 1-7, wherein a TB of the plurality of TBs corresponds to at least one of a spatial layer or an antenna port, wherein the TB specific beam configuration indicates a plurality of beams, wherein two or more of the plurality of beams correspond to one of the at least one of the spatial layer or the antenna port.

Aspect 9: The method of any of Aspects 1-8, wherein communicating the plurality of TBs comprises transmitting a repetition of a first TB serially with a repetition of a second TB in at least one of a time domain or a frequency domain.

Aspect 10: The method of any of Aspects 1-9, wherein communicating the plurality of TBs comprises interlacing a repetition of a first TB with a repetition of a second TB in at least one of a time domain or a frequency domain.

Aspect 11: The method of any of Aspects 1-10, wherein a TB of the plurality of TBs corresponds to a subset of a set of spatial resources, wherein the set of spatial resources comprises at least one of a plurality of spatial layers or a plurality of antenna ports, wherein the TB specific beam configuration indicates a plurality of sets of beams, and wherein a set of the plurality of sets of beams corresponds to the subset of the set of spatial resources.

Aspect 12: The method of any of Aspects 1-11, wherein the TB specific beam configuration comprises at least one beam indication having at least one beam indication type, wherein the at least one beam indication type comprises at least one of: a joint downlink and uplink transmission configuration indicator (TCI) state, a separate downlink TCI state, a separate uplink TCI state, a single-channel downlink TCI state, a single-channel uplink TCI state, or a single-channel spatial relation information indication.

Aspect 13: The method of any of Aspects 1-12, wherein receiving the TB specific beam configuration comprises receiving at least one of: a downlink control information (DCI) transmission that schedules a transmission of the plurality of TBs, a medium access control control element (MAC-CE) that activates a semi-persistent periodic transmission of the plurality of TBs, or a radio resource control (RRC) message that schedules a transmission of the plurality of the TBs.

Aspect 14: The method of Aspect 13, further comprising receiving, via at least one of the RRC message or the MAC-CE, a mapping indication indicating a mapping between a plurality of transmission configuration indication (TCI) states and a plurality of corresponding TCI codepoints in the DCI transmission.

Aspect 15: The method of any of Aspects 1-14, further comprising receiving a plurality of TB specific feedback configurations, wherein each TB specific feedback configuration of the plurality of TB specific feedback configurations indicates one or more beams corresponding to a feedback transmission, of a plurality of feedback transmissions, associated with at least one of the TB or the TB group.

Aspect 16: The method of Aspect 15, wherein the plurality of TB specific feedback configurations comprises at least one of: a time division multiplexing (TDM) based beam configuration, a frequency division multiplexing (FDM) based beam configuration, or a spatial division multiplexing (SDM) based beam configuration.

Aspect 17: The method of either of Aspects 15 or 16, wherein the plurality of TB specific feedback configurations comprises at least one of: a high reliability feedback configuration indicating a first set of feedback parameters, or a low reliability feedback configuration indicating a second set of feedback parameters.

Aspect 18: The method of Aspect 17, further comprising applying at least one of the high reliability feedback configuration or the low reliability feedback configuration based at least in part on at least one uplink physical layer priority indicator, wherein the first set of feedback parameters comprises at least one of: a first physical uplink control channel (PUCCH) resource, a first PUCCH starting time, a first repetition number, or a first beam sweep pattern, and wherein the second set of feedback parameters comprises at least one of: a second PUCCH resource, a second PUCCH starting time, a second repetition number, or a second beam sweep pattern.

Aspect 19: The method of Aspect 18, wherein the first PUCCH starting time is determined based at least in part on a last physical downlink shared channel (PDSCH) occasion or a last PDSCH carrying a TB in a TB group mapped to the high reliability feedback configuration.

Aspect 20: The method of either of Aspects 18 or 19, wherein the at least one uplink physical layer priority indicator comprises a first indicator corresponding to the high reliability feedback configuration and a second indicator corresponding to the low reliability feedback configuration.

Aspect 21: The method of any of Aspects 15-20, wherein the plurality of TB specific feedback configurations include: a first TB specific feedback configuration associated with a first TB group of the plurality of TB groups, wherein a first group index corresponds to the first TB group; and a second TB specific feedback configuration associated with a second TB group of the plurality of TB groups, wherein a second group index corresponds to the second TB group.

Aspect 22: The method of Aspect 21, wherein the first group index or the second group index is associated with the TB of the plurality of TBs based at least in part on at least one of a scheduled TB order or a signaled TB order.

Aspect 23: The method of any of Aspects 15-22, wherein a mapping between a feedback configuration of the plurality of TB specific feedback configurations and a TB group of the plurality of TB groups is based at least in part on at least one of: a signaled order, or a feedback configuration identifier that corresponds to a TB group identifier.

Aspect 24: The method of any of Aspects 1-23, wherein the TB specific beam configuration indicates a default physical downlink shared channel (PDSCH) beam fixed across a plurality of slots to be used for receiving downlink communications from a transmit receive point (TRP).

Aspect 25: The method of Aspect 24, wherein the TB specific beam configuration indicates an additional default PDSCH beam fixed across the plurality of slots to be used for receiving downlink communications from an additional TRP.

Aspect 26: The method of either of Aspects 24 or 25, further comprising receiving a single downlink control information (DCI) transmission that schedules the plurality of TBs in a plurality of PDSCH occasions, wherein an offset between the DCI transmission and a first PDSCH occasion of the plurality of PDSCH occasions is greater than or equal to a beam switch latency threshold.

Aspect 27: The method of any of Aspects 24-26, wherein the default PDSCH beam is based at least in part on a quasi co-location rule for receiving a core resource set (CORE- SET) associated with the TRP and corresponding to an active downlink bandwidth part.

Aspect 28: The method of any of Aspects 24-27, wherein the default PDSCH beam is based at least in part on a transmission configuration indication state associated with the TRP and corresponding to an active downlink bandwidth part.

Aspect 29: The method of any of Aspects 24-28, wherein the one or more beams corresponding to the at least one of the TB or the TB group comprise the default PDSCH beam based at least in part on a determination that multiple-TB multiple PDSCH transmission operation is enabled.

Aspect 30: The method of Aspect 1, further comprising receiving downlink control information (DCI) comprising a single DCI field that indicates at least one transmission configuration indicator (TCI) state associated with a code point, wherein communicating the plurality of TBs comprises applying the TB specific beam configuration to each TB of the plurality of TBs, wherein the plurality of TBs correspond to a scheduling grant indicated by the DCI.

Aspect 31: The method of Aspect 30, wherein the at least one TCI state consists of only one TCI state.

Aspect 32: The method of Aspect 30, wherein the at least one TCI state consists of two TCI states.

Aspect 33: The method of any of Aspects 30-31, wherein at least one TB of the plurality of TBs corresponds to at least one of a spatial layer or an antenna port.

Aspect 34: A method of wireless communication performed by a base station, comprising: transmitting a transport block (TB) specific beam configuration for communicating a plurality of transport blocks (TBs), wherein the TB specific beam configuration indicates one or more beams corresponding to at least one of a TB of the plurality of TBs or a TB group of a plurality of TB groups; and receiving the plurality of transport blocks (TBs) based at least in part on the TB specific beam configuration.

Aspect 35: The method of Aspect 34, wherein the TB specific beam configuration comprises at least one of: a time division multiplexing (TDM) based beam configuration, a frequency division multiplexing (FDM) based beam configuration, or a spatial division multiplexing (SDM) based beam configuration.

Aspect 36: The method of either of Aspects 34 or 35, wherein the plurality of TBs comprises a plurality of repetitions of a TB, each repetition of the plurality of repetitions corresponding to a shared channel occasion of a plurality of shared channel occasions, and wherein the TB specific beam configuration indicates one or more beams corresponding to the plurality of repetitions of the TB.

Aspect 37: The method of Aspect 36, wherein communicating the plurality of TBs comprises at least one of: time division multiplexing the plurality of repetitions across a plurality of slots or a plurality of sub-slots, or frequency division multiplexing the plurality of repetitions across a plurality of sets of resource blocks (RBs) or a plurality of tones of a single RB.

Aspect 38: The method of any of Aspects 34-37, wherein a plurality of portions of a TB of the plurality of TBs corresponds to a plurality of portions of a shared channel occasion, and wherein the TB specific beam configuration indicates one or more beams corresponding to the plurality of portions of the shared channel occasion.

Aspect 39: The method of Aspect 38, wherein communicating the plurality of TBs comprises at least one of: time division multiplexing the plurality of portions of the TB across a plurality of slots or a plurality of sub-slots, or frequency division multiplexing the plurality of portions of the TB across a plurality of sets of resource blocks (RBs) or a plurality of tones of a single RB.

Aspect 40: The method of any of Aspects 34-39, wherein a TB of the plurality of TBs corresponds to at least one of a plurality of spatial layers or a plurality of antenna ports, wherein the TB specific beam configuration indicates a plurality of beams, wherein each of the plurality of beams corresponds to one of the at least one of the plurality of spatial layers or the plurality of antenna ports.

Aspect 41: The method of any of Aspects 34-40, wherein a TB of the plurality of TBs corresponds to at least one of a spatial layer or an antenna port, wherein the TB specific beam configuration indicates a plurality of beams, wherein two or more of the plurality of beams correspond to one of the at least one of the spatial layer or the antenna port.

Aspect 42: The method of any of Aspects 34-41, wherein communicating the plurality of TBs comprises transmitting a repetition of a first TB serially with a repetition of a second TB in at least one of a time domain or a frequency domain.

Aspect 43: The method of any of Aspects 34-42, wherein communicating the plurality of TBs comprises interlacing a repetition of a first TB with a repetition of a second TB in at least one of a time domain or a frequency domain.

Aspect 44: The method of any of Aspects 34-43, wherein a TB of the plurality of TBs corresponds to a subset of a set of spatial resources, wherein the set of spatial resources comprises at least one of a plurality of spatial layers or a plurality of antenna ports, wherein the TB specific beam configuration indicates a plurality of sets of beams, and wherein a set of the plurality of sets of beams corresponds to the subset of the set of spatial resources.

Aspect 45: The method of any of Aspects 34-44, wherein the TB specific beam configuration comprises at least one beam indication having at least one beam indication type, wherein the at least one beam indication type comprises at least one of: a joint downlink and uplink transmission configuration indicator (TCI) state, a separate downlink TCI state, a separate uplink TCI state, a single-channel downlink TCI state, a single-channel uplink TCI state, or a single-channel spatial relation information indication.

Aspect 46: The method of any of Aspects 34-45, wherein transmitting the TB specific beam configuration comprises transmitting at least one of: a downlink control information (DCI) transmission that schedules a transmission of the plurality of TBs, a medium access control control element (MAC-CE) that activates a semi-persistent periodic transmission of the plurality of TBs, or a radio resource control (RRC) message that schedules a transmission of the plurality of the TBs.

Aspect 47: The method of Aspect 46, further comprising transmitting, via at least one of the RRC message or the MAC-CE, a mapping indication indicating a mapping between a plurality of transmission configuration indication (TCI) states and a plurality of corresponding TCI codepoints in the DCI transmission.

Aspect 48: The method of any of Aspects 34-47, further comprising transmitting a plurality of TB specific feedback configurations, wherein each TB specific feedback configuration of the plurality of TB specific feedback configurations indicates one or more beams corresponding to a feedback transmission, of a plurality of feedback transmissions, associated with at least one of the TB or the TB group.

Aspect 49: The method of Aspect 48, wherein the plurality of TB specific feedback configurations comprises at least one of: a time division multiplexing (TDM) based beam configuration, a frequency division multiplexing (FDM)

based beam configuration, or a spatial division multiplexing (SDM) based beam configuration.

Aspect 50: The method of either of Aspects 48 or 49, wherein the plurality of TB specific feedback configurations comprises at least one of: a high reliability feedback configuration indicating a first set of feedback parameters, or a low reliability feedback configuration indicating a second set of feedback parameters.

Aspect 51: The method of Aspect 50, further comprising applying at least one of the high reliability feedback configuration or the low reliability feedback configuration based at least in part on at least one uplink physical layer priority indicator, wherein the first set of feedback parameters comprises at least one of: a first physical uplink control channel (PUCCH) resource, a first PUCCH starting time, a first repetition number, or a first beam sweep pattern, and wherein the second set of feedback parameters comprises at least one of: a second PUCCH resource, a second PUCCH starting time, a second repetition number, or a second beam sweep pattern.

Aspect 52: The method of Aspect 51, wherein the first PUCCH starting time is determined based at least in part on a last physical downlink shared channel (PDSCH) occasion or a last PDSCH carrying a TB in a TB group mapped to the high reliability feedback configuration.

Aspect 53: The method of either of Aspects 51 or 52, wherein the at least one uplink physical layer priority indicator comprises a first indicator corresponding to the high reliability feedback configuration and a second indicator corresponding to the low reliability feedback configuration.

Aspect 54: The method of any of Aspects 50-53, wherein the plurality of TB specific feedback configurations include: a first TB specific feedback configuration associated with a first TB group of the plurality of TB groups, wherein a first group index corresponds to the first TB group; and a second TB specific feedback configuration associated with a second TB group of the plurality of TB groups, wherein a second group index corresponds to the second TB group.

Aspect 55: The method of Aspect 54, wherein the first group index or the second group index is associated with the TB of the plurality of TBs based at least in part on at least one of a scheduled TB order or a signaled TB order.

Aspect 56: The method of any of Aspects 48-55, wherein a mapping between a feedback configuration of the plurality of TB specific feedback configurations and a TB group of the plurality of TB groups is based at least in part on at least one of: a signaled order, or a feedback configuration identifier that corresponds to a TB group identifier.

Aspect 57: The method of any of Aspects 34-56, wherein the TB specific beam configuration indicates a default physical downlink shared channel (PDSCH) beam fixed across a plurality of slots to be used for receiving downlink communications from a transmit receive point (TRP).

Aspect 58: The method of Aspect 57, wherein the TB specific beam configuration indicates an additional default PDSCH beam fixed across the plurality of slots to be used for receiving downlink communications from an additional TRP.

Aspect 59: The method of either of Aspects 57 or 58, further comprising transmitting a single downlink control information (DCI) transmission that schedules the plurality of TBs in a plurality of PDSCH occasions, wherein an offset between the DCI transmission and a first PDSCH occasion of the plurality of PDSCH occasions is greater than or equal to a beam switch latency threshold.

Aspect 60: The method of any of Aspects 57-59, wherein the default PDSCH beam is based at least in part on a quasi co-location rule for receiving a core resource set (CORESET) associated with the TRP and corresponding to an active downlink bandwidth part.

Aspect 61: The method of any of Aspects 57-60, wherein the default PDSCH beam is based at least in part on a transmission configuration indication state associated with the TRP and corresponding to an active downlink bandwidth part.

Aspect 62: The method of any of Aspects 57-61, wherein the one or more beams corresponding to the at least one of the TB or the TB group comprise the default PDSCH beam based at least in part on a determination that multiple-TB multiple PDSCH transmission operation is enabled.

Aspect 63: The method of Aspect 34, further comprising transmitting downlink control information (DCI) comprising a single DCI field that indicates at least one transmission configuration indicator (TCI) state associated with a code point, wherein receiving the plurality of TBs comprises receiving the plurality of TBs based at least in part on an application of the TB specific beam configuration to each TB of the plurality of TBs, wherein the plurality of TBs correspond to a scheduling grant indicated by the DCI.

Aspect 64: The method of Aspect 63, wherein the at least one TCI state consists of only one TCI state.

Aspect 65: The method of Aspect 63, wherein the at least one TCI state consists of two TCI states.

Aspect 66: The method of any of Aspects 63-65, wherein at least one TB of the plurality of TBs corresponds to at least one of a spatial layer or an antenna port.

Aspect 67: An apparatus for wireless communication at a device, comprising a processor; memory coupled with the processor; and instructions stored in the memory and executable by the processor to cause the apparatus to perform the method of one or more of Aspects 1-33.

Aspect 68: A device for wireless communication, comprising a memory and one or more processors coupled to the memory, the one or more processors configured to perform the method of one or more of Aspects 1-33.

Aspect 69: An apparatus for wireless communication, comprising at least one means for performing the method of one or more of Aspects 1-33.

Aspect 70: A non-transitory computer-readable medium storing code for wireless communication, the code comprising instructions executable by a processor to perform the method of one or more of Aspects 1-33.

Aspect 71: A non-transitory computer-readable medium storing a set of instructions for wireless communication, the set of instructions comprising one or more instructions that, when executed by one or more processors of a device, cause the device to perform the method of one or more of Aspects 1-33.

Aspect 72: An apparatus for wireless communication at a device, comprising a processor; memory coupled with the processor; and instructions stored in the memory and executable by the processor to cause the apparatus to perform the method of one or more of Aspects 34-66.

Aspect 73: A device for wireless communication, comprising a memory and one or more processors coupled to the memory, the one or more processors configured to perform the method of one or more of Aspects 34-66.

Aspect 74: An apparatus for wireless communication, comprising at least one means for performing the method of one or more of Aspects 34-66.

Aspect 75: A non-transitory computer-readable medium storing code for wireless communication, the code comprising instructions executable by a processor to perform the method of one or more of Aspects 34-66.

Aspect 76: A non-transitory computer-readable medium storing a set of instructions for wireless communication, the set of instructions comprising one or more instructions that, when executed by one or more processors of a device, cause the device to perform the method of one or more of Aspects 34-66.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving a transport block (TB) specific beam configuration for communicating a plurality of TBs, wherein the TB specific beam configuration indicates one or more beams corresponding to at least one of a TB of the plurality of TBs or a TB group of a plurality of TB groups;

receiving a TB specific feedback configuration for communicating feedback corresponding to the plurality of TBs, wherein the TB specific feedback configuration indicates feedback parameters corresponding to the at least one TB of the plurality of TBs or the TB group of the plurality of TB groups, the TB specific feedback configuration corresponding to the TB specific beam configuration, and wherein at least one TB of the plurality of TBs or at least one TB group of the plurality of TB groups has a quality of service (QoS) requirement different from another TB of the plurality of TBs or from another TB group of the plurality of TB groups, the QoS requirement associated with the TB specific beam configuration and associated with the TB specific feedback configuration being similar; and communicating the plurality of TBs or TB groups based at least in part on the TB specific beam configuration.

2. The method of claim 1, further comprising receiving downlink control information (DCI) comprising a single DCI field that indicates at least one transmission configuration indicator (TCI) state associated with a code point, wherein communicating the plurality of TBs or TB groups comprises applying the TB specific beam configuration to each TB of the plurality of TBs or to each TB group of the plurality of TB groups, and wherein the plurality of TBs or TB groups correspond to a scheduling grant indicated by the DCI.

3. The method of claim 2, wherein the at least one TCI state consists of only one TCI state.

4. The method of claim 2, wherein the at least one TCI state consists of two TCI states.

5. The method of claim 2, wherein at least one TB of the plurality of TBs or TB group of the plurality of TB groups corresponds to at least one of a spatial layer or an antenna port.

6. The method of claim 1, wherein the TB specific beam configuration comprises at least one of:

a time division multiplexing (TDM) based beam configuration, a frequency division multiplexing (FDM) based beam configuration, or a spatial division multiplexing (SDM) based beam configuration.

7. The method of claim 1, wherein the plurality of TBs comprises a plurality of repetitions of a TB, each repetition of the plurality of repetitions of a TB corresponding to a shared channel occasion of a plurality of shared channel occasions, and wherein the TB specific beam configuration indicates one or more beams corresponding to the plurality of repetitions of the TB, or wherein the plurality of TB groups comprises a plurality of repetitions of a TB group, each repetition of the plurality of repetitions of a TB group corresponding to a shared channel occasion of a plurality of shared channel occasions, and wherein the TB specific beam configuration indicates one or more beams corresponding to the plurality of repetitions of the TB group.

8. The method of claim 7, wherein communicating the plurality of TBs or TB groups comprises at least one of:

time division multiplexing the plurality of repetitions of a TB or a TB group across a plurality of slots or a plurality of sub-slots, or frequency division multiplexing the plurality of repetitions of a TB or a TB group across a plurality of sets of resource blocks (RBs) or a plurality of tones of a single RB.

9. The method of claim 1, wherein a plurality of portions of a TB of the plurality of TBs or a TB group of the plurality of TB groups corresponds to a plurality of portions of a shared channel occasion, and wherein the TB specific beam configuration indicates one or more beams corresponding to the plurality of portions of the shared channel occasion.

10. The method of claim 9, wherein communicating the plurality of TBs or TB groups comprises at least one of:

time division multiplexing the plurality of portions of the TB or the TB group across a plurality of slots or a plurality of sub-slots, or frequency division multiplexing the plurality of portions of the TB or the TB group across a plurality of sets of resource blocks (RBs) or a plurality of tones of a single RB.

11. The method of claim 1, wherein a TB of the plurality of TBs or a TB group of the plurality of TB groups corresponds to at least one of a plurality of spatial layers or a plurality of antenna ports, wherein the TB specific beam configuration indicates a plurality of beams, and wherein each of the plurality of beams corresponds to one of the at least one of the plurality of spatial layers or the plurality of antenna ports.

12. The method of claim 1, wherein a TB of the plurality of TBs or a TB group of the plurality of TB groups corresponds to at least one of a spatial layer or an antenna port, wherein the TB specific beam configuration indicates a plurality of beams, and wherein two or more of the plurality of beams correspond to one of the at least one of the spatial layer or the antenna port.

13. The method of claim 1, wherein communicating the plurality of TBs or TB groups comprises transmitting a repetition of a first TB or first TB group serially with a repetition of a second TB or second TB group in at least one of a time domain or a frequency domain.

14. The method of claim 1, wherein communicating the plurality of TBs or TB groups comprises interlacing a repetition of a first TB or first TB group with a repetition of a second TB or second TB group in at least one of a time domain or a frequency domain.

15. The method of claim 1, wherein a TB of the plurality of TBs or a TB group of the plurality of TB groups corresponds to a subset of a set of spatial resources, wherein the set of spatial resources comprises at least one of a plurality of spatial layers or a plurality of antenna ports, wherein the TB specific beam configuration indicates a plurality of sets of beams, and wherein a set of the plurality of sets of beams corresponds to the subset of the set of spatial resources.

16. The method of claim 1, wherein the TB specific beam configuration comprises at least one beam indication having at least one beam indication type, wherein the at least one beam indication type comprises at least one of:

a joint downlink and uplink transmission configuration indicator (TCI) state, a separate downlink TCI state, a separate uplink TCI state, a single-channel downlink TCI state, a single-channel uplink TCI state, or a single-channel spatial relation information indication.

17. The method of claim 1, wherein receiving the TB specific beam configuration comprises receiving at least one of:

a downlink control information (DCI) transmission that schedules a transmission of the plurality of TBs or TB groups, a medium access control control element (MAC-CE) that activates a semi-persistent periodic transmission of the plurality of TBs or TB groups, or a radio resource control (RRC) message that schedules a transmission of the plurality of the TBs or TB groups.

18. The method of claim 17, further comprising receiving, via at least one of the RRC message or the MAC-CE, a mapping indication indicating a mapping between a plurality of transmission configuration indication (TCI) states and a plurality of corresponding TCI codepoints in the DCI transmission.

19. The method of claim 1, further comprising receiving a plurality of TB specific feedback configurations, wherein each TB specific feedback configuration of the plurality of TB specific feedback configurations indicates one or more beams corresponding to a feedback transmission, of a plurality of feedback transmissions, associated with at least one of the TB or the TB group.

20. The method of claim 19, wherein the plurality of TB specific feedback configurations comprises at least one of:

a time division multiplexing (TDM) based beam configuration, a frequency division multiplexing (FDM) based beam configuration, or a spatial division multiplexing (SDM) based beam configuration.

21. The method of claim 1, wherein the TB specific beam configuration indicates a default physical downlink shared channel (PDSCH) beam fixed across a plurality of slots to be used for receiving downlink communications from a transmit receive point (TRP).

22. A method of wireless communication performed by a network node, comprising:

transmitting a transport block (TB) specific beam configuration for communicating a plurality of TBs, wherein the TB specific beam configuration indicates one or more beams corresponding to at least one of a TB of the plurality of TBs or a TB group of a plurality of TB groups;

transmitting a TB specific feedback configuration for communicating feedback corresponding to the plurality of TBs, wherein the TB specific feedback configuration indicates feedback parameters corresponding to the at least one TB of the plurality of TBs or the TB group of the plurality of TB groups, the TB specific feedback configuration corresponding to the TB specific beam configuration, and wherein at least one TB of the plurality of TBs or at least one TB group of the plurality of TB groups has a quality of service (QoS) requirement different from another TB of the plurality of TBs or from another TB group of the plurality of TB groups, the QoS requirement associated with the TB specific beam configuration and associated with the TB specific feedback configuration being similar; and receiving the plurality of TBs or TB groups based at least in part on the TB specific beam configuration.

23. The method of claim 22, further comprising transmitting downlink control information (DCI) comprising a single DCI field that indicates at least one transmission configuration indicator (TCI) state associated with a code point, wherein receiving the plurality of TBs or TB groups comprises receiving the plurality of TBs based at least in part on an application of the TB specific beam configuration to each TB of the plurality of TBs or to each TB group of the plurality of TB groups, and wherein the plurality of TBs or TB groups correspond to a scheduling grant indicated by the DCI.

24. The method of claim 23, wherein the at least one TCI state consists of only one TCI state.

25. The method of claim 23, wherein the at least one TCI state consists of two TCI states.

26. The method of claim 23, wherein at least one TB of the plurality of TBs corresponds to at least one of a spatial layer or an antenna port.

27. A user equipment (UE) for wireless communication, comprising:

a memory;

a transceiver; and one or more processors, coupled to the memory and the transceiver, configured to:

receive, via the transceiver, a transport block (TB) specific beam configuration for communicating a plurality of TBs, wherein the TB specific beam configuration indicates one or more beams corresponding to at least one of a TB of the plurality of TBs or a TB group of a plurality of TB groups;

receive a TB specific feedback configuration for communicating feedback corresponding to the plurality of TBs, wherein the TB specific feedback configuration indicates feedback parameters corresponding to the at least one TB of the plurality of TBs or the TB group of the plurality of TB groups, the TB specific feedback configuration corresponding to the TB specific beam configuration, and wherein at least one TB of the plurality of TBs or at least one TB group of the plurality of TB groups has a quality of service (QoS) requirement different from another TB of the plurality of TBs or from another TB group of the plurality of TB groups, the QoS requirement associated with the TB specific beam configuration and associated with the TB specific feedback configuration being similar; and communicate, via the transceiver, the plurality of TBs or TB groups based at least in part on the TB specific beam configuration.

28. The UE of claim 27, wherein the one or more processors are further configured to receive downlink control information (DCI) comprising a single DCI field that indicates at least one transmission configuration indicator (TCI) state associated with a code point, wherein the one or more processors, to communicate the plurality of TBs or TB groups, are configured to apply the TB specific beam configuration to each TB of the plurality of TBs or to each TB group of the plurality of TB groups, and wherein the plurality of TBs or TB groups correspond to a scheduling grant indicated by the DCI.

29. A network node for wireless communication, comprising:

a memory; and one or more processors, coupled to the memory, configured to:

transmit a transport block (TB) specific beam configuration for communicating a plurality of TBs, wherein the TB specific beam configuration indicates one or more beams corresponding to at least one of a TB of the plurality of TBs or a TB group of a plurality of TB groups;

transmit a TB specific feedback configuration for communicating feedback corresponding to the plurality of TBs, wherein the TB specific feedback configuration indicates feedback parameters corresponding to the at least one TB of the plurality of TBs or the TB group of the plurality of TB groups, the TB specific feedback configuration corresponding to the TB specific beam configuration, and wherein at least one TB of the plurality of TBs or at least one TB group of the plurality of TB groups has a quality of service (QoS) requirement different from another TB of the plurality of TBs or from another TB group of the plurality of TB groups, the QoS requirement associated with the TB specific beam configuration and associated with the TB specific feedback configuration being similar; and receive the plurality of TBs or TB groups based at least in part on the TB specific beam configuration.

30. The network node of claim 29, wherein the one or more processors are further configured to transmit downlink control information (DCI) comprising a single DCI field that indicates at least one transmission configuration indicator (TCI) state associated with a code point, wherein the one or more processors, to receive the plurality of TBs or TB groups, are configured to receive the plurality of TBs based at least in part on an application of the TB specific beam configuration to each TB of the plurality of TBs or to each TB group of the plurality of TB groups, and wherein the plurality of TBs or TB groups correspond to a scheduling grant indicated by the DCI.

* * * * *